United States Patent
Volk et al.

(10) Patent No.: US 8,230,452 B2
(45) Date of Patent: Jul. 24, 2012

(54) MINIATURIZED DISC DRIVE CONTAINING DVD-COMPATIBLE OPTICAL CONTROLLER

(75) Inventors: Steven B. Volk, Boulder, CO (US); Jerry E. Hurst, Jr., San Jose, CA (US)

(73) Assignee: VMO Systems, Inc., Boulder, CO (US)

( * ) Notice: Subject to any disclaimer, the term of this patent is extended or adjusted under 35 U.S.C. 154(b) by 0 days.

(21) Appl. No.: 12/316,176

(22) Filed: Dec. 10, 2008

(65) Prior Publication Data

US 2009/0147655 A1 Jun. 11, 2009

Related U.S. Application Data

(60) Continuation of application No. 11/512,936, filed on Aug. 30, 2006, now Pat. No. 7,506,347, which is a division of application No. 10/846,849, filed on May 13, 2004, now abandoned.

(51) Int. Cl.
*G11B 17/03* (2006.01)

(52) U.S. Cl. ...................................... 720/630

(58) Field of Classification Search ................. 720/659, 720/718, 630; 369/275.1, 275.2, 284, 300
See application file for complete search history.

(56) References Cited

U.S. PATENT DOCUMENTS

| | | | | |
|---|---|---|---|---|
| 5,214,550 A * | 5/1993 | Chan | .......................... | 360/97.01 |
| 5,521,895 A | 5/1996 | Miura et al. | ................. | 369/47.4 |
| 6,052,279 A | 4/2000 | Friend et al. | ................... | 361/686 |
| 6,091,563 A | 7/2000 | Thomas, III et al. | ........... | 360/69 |
| 6,137,759 A | 10/2000 | Ogiro et al. | .................... | 720/640 |
| 6,141,306 A | 10/2000 | Andoh | ........................ | 369/53.35 |
| 6,185,069 B1 | 2/2001 | Schick | .......................... | 360/133 |
| 6,193,162 B1 * | 2/2001 | Niwata et al. | ................. | 235/487 |
| 6,414,925 B2 | 7/2002 | Andoh | ........................ | 369/53.24 |
| 6,442,637 B1 | 8/2002 | Hawkins et al. | .............. | 710/300 |
| 6,525,932 B1 | 2/2003 | Ohnishi et al. | ................ | 361/686 |
| 6,687,215 B1 | 2/2004 | Bagnell et al. | ................ | 720/740 |
| 6,751,694 B2 | 6/2004 | Liu et al. | ........................ | 710/301 |
| 6,762,906 B1 | 7/2004 | Wakita et al. | .............. | 360/97.01 |
| 6,813,661 B2 | 11/2004 | Li | ................................. | 710/62 |
| 6,826,018 B2 | 11/2004 | Kuwajima et al. | .......... | 360/254.3 |
| 6,873,524 B2 | 3/2005 | Kaczeus et al. | ............... | 361/685 |
| 6,934,568 B2 | 8/2005 | Charlier et al. | ............. | 455/575.3 |
| 6,947,254 B2 | 9/2005 | Edwards et al. | ........... | 360/99.09 |
| 7,012,875 B2 * | 3/2006 | Shimano et al. | .......... | 369/112.02 |
| 7,018,696 B2 | 3/2006 | Nee | ................................. | 28/64.1 |
| 7,045,187 B2 | 5/2006 | Nee | ................................. | 28/64.1 |
| 7,054,963 B2 | 5/2006 | Betts-LaCroix et al. | ....... | 710/62 |

(Continued)

FOREIGN PATENT DOCUMENTS

JP 08194977 7/1996

(Continued)

OTHER PUBLICATIONS

EPO Patent Abstracts of Japan, vol. 2003, No. 1, Jan. 14, 2003 (JP 2002 269960 Toshiba Corp.).

(Continued)

*Primary Examiner* — Angel A. Castro
(74) *Attorney, Agent, or Firm* — Patentability Associates

(57) ABSTRACT

A miniature optical disc drive includes a DVD-compatible optical controller and a cartridge load module designed to hold a cartridge containing a 32 mm optical data storage disc.

20 Claims, 35 Drawing Sheets

U.S. PATENT DOCUMENTS

| | | | |
|---|---|---|---|
| 7,166,415 B2 * | 1/2007 | Horie et al. | 430/270.13 |
| 7,180,842 B2 * | 2/2007 | Ishibashi et al. | 369/53.25 |
| 7,196,981 B2 | 3/2007 | Yoshinaka et al. | 369/44.41 |
| 7,197,584 B2 | 3/2007 | Huber et al. | 710/72 |
| 7,257,073 B2 * | 8/2007 | Nakamura et al. | 369/59.25 |
| 2001/0006503 A1 * | 7/2001 | Braitberg et al. | 369/77.2 |
| 2001/0014071 A1 * | 8/2001 | Braitberg et al. | 369/75.1 |
| 2001/0047453 A1 | 11/2001 | Edwards et al. | 711/115 |
| 2002/0048224 A1 | 4/2002 | Dygert et al. | 361/1 |
| 2002/0101816 A1 * | 8/2002 | Braitberg et al. | 369/291 |
| 2003/0007640 A1 | 1/2003 | Harada et al. | 380/270 |
| 2003/0117938 A1 * | 6/2003 | Braitberg et al. | 369/291 |
| 2003/0231570 A1 | 12/2003 | Oishi | 369/75.1 |
| 2004/0002018 A1 | 1/2004 | Oishi et al. | 430/270.13 |
| 2004/0126706 A1 | 7/2004 | Lee et al. | 430/270.15 |
| 2004/0136299 A1 | 7/2004 | Han | 369/53.26 |
| 2004/0137935 A1 | 7/2004 | Zarom | 455/550.1 |
| 2004/0212926 A1 | 10/2004 | Volk et al. | 360/133 |
| 2004/0242224 A1 | 12/2004 | Janik et al. | 455/426.1 |
| 2005/0078195 A1 | 4/2005 | VanWagner | 348/231.3 |
| 2005/0180272 A1 * | 8/2005 | Bell et al. | 369/44.14 |
| 2005/0240954 A1 * | 10/2005 | Santo et al. | 720/715 |
| 2005/0254367 A1 | 11/2005 | Volk et al. | 369/47.1 |
| 2006/0035707 A1 | 2/2006 | Nguyen et al. | 463/29 |
| 2006/0062095 A1 | 3/2006 | Volk et al. | 369/30.19 |
| 2006/0075342 A1 | 4/2006 | Penning | 715/704 |
| 2006/0120231 A1 * | 6/2006 | Pleiss et al. | 369/44.27 |
| 2006/0121878 A1 | 6/2006 | Kelly et al. | 455/406 |
| 2006/0206582 A1 | 9/2006 | Finn | 709/217 |
| 2007/0079014 A1 | 4/2007 | Volk et al. | 710/1 |
| 2008/0205211 A1 * | 8/2008 | Pleiss et al. | 369/44.27 |
| 2009/0129248 A1 | 5/2009 | Hurst, Jr. et al. | 369/272.1 |
| 2009/0144763 A1 | 6/2009 | Hurst, Jr. et al. | 720/718 |

FOREIGN PATENT DOCUMENTS

| | | |
|---|---|---|
| JP | 09-063104 | 3/1997 |
| WO | WO 00/74049 | 12/2000 |
| WO | WO 2004/053868 A1 | 6/2004 |
| WO | WO 2004/059453 | 7/2004 |
| WO | WO 2004/100167 | 11/2004 |

OTHER PUBLICATIONS

EPO Patent Abstracts of Japan, vol. 2003, No. 1, Jan. 14, 2003 (JP 2002 281126 (Ricoh Co. Ltd.).

U.S. Appl. No. 60/542,406, filed Feb. 6, 2004, Ray et al.

* cited by examiner

MINIATURIZED DISC DRIVE CONTAINING DVD-COMPATIBLE OPTICAL CONTROLLER

CROSS REFERENCE TO RELATED APPLICATIONS

This application is a continuation of application Ser. No. 11/512,936, filed Aug. 30, 2006, which in turn is a divisional of application Ser. No. 10/846,849, filed May 13, 2004 (abandoned). Each of the foregoing applications is incorporated herein by reference in its entirety. This application is related to the following United States patent applications, each of which is incorporated herein by reference in its entirety: application Ser. No. 10/383,193, filed Mar. 5, 2003 (abandoned); application Ser. No. 10/423,097, filed Apr. 25, 2003, now U.S. Pat. No. 7,013,476; and application Ser. No. 10/423,701, filed Apr. 25, 2003, now U.S. Pat. No. 7,058,959.

FIELD OF THE INVENTION

This application relates to a disc drive capable of reading data from an optical data storage disc, and in particular an extremely small optical disc drive containing DVD-compatible controller.

BACKGROUND

Consumer entertainment technologies are moving towards high resolution color displays for mobile entertainment. Increasingly, consumers want to take their entertainment with them. Cross-country travelers and cross-town commuters are eagerly pursuing gaming, music and video entertainment activities on mobile phones (smartphones), personal digital assistants (PDAs) and portable computers. At present, however, the entertainment experience is limited, even primitive, compared to what consumers have come to expect from their game consoles, home theaters and DVD-equipped computers.

The main problem is data storage. The fact is that sophisticated digital entertainment is data-intensive, and it is growing more so every day. Traditional small "form factor," portable media such as CompactFlash® cards, SD® flash cards, Memory Stick™ and other solid state memory devices simply cannot deliver the capacity and price per megabyte required for a high-quality entertainment experience. Recording content onto solid state memory cards in high volume is expensive and impractical, and securing that content effectively is very difficult.

While some experts predict that broadband Internet access will deliver high-quality games and movies to mobile consumer electronics devices, there are significant barriers to success. Mobile phone networks are designed to transmit voice communications and are simply not efficient for high-capacity data transmission. Mobile phone connections are not capable of the required speeds and are notoriously unreliable, with frequent dead zones and dropped connections. While games are being delivered to mobile phones currently, the quality of game play and the game environment cannot begin to approach that of a console.

WiFi, or 802.11, wireless is designed for data transmission, and the growing number of WiFi hotspots looks attractive on the surface for delivering large amounts of data to mobile devices. Internet access and email application for multiple users are easily accommodated by WiFi. Nonetheless, managing streaming and interactive content such as multiplayer games and high-quality video or movies for thousands, if not millions, of users simultaneously will be challenging for any network. Security is also a problem for WiFi, leaving content providers open to potential piracy.

Moreover, the data storage problem would still exist. For any sort of networked delivery system to be viable, mobile consumer devices will have to embed significant amounts of storage to hold large, downloaded game and movie files, and to track a player's progress within the game. Perhaps the most significant problem for networked content delivery is cost. It has been estimated that it can cost more than $30 to send a DVD-quality film over the Internet.

Disc-based distribution costs are far lower. Even more compelling is the fact that consumers have consistently demonstrated their preference for purchasing high-value content on discs, as evidenced by the recent upswing in DVD sales. Moreover, optical discs are molded and can therefore be replicated at less expense than solid state memory devices.

In order for a disc drive to be useful in this context, it must be extremely small. It must also be capable withstanding extremely severe environmental and physical conditions. Small size, low power consumption, environmental endurance, low cost and light weight are characteristics that must coexist in this disc drive. They cannot be met by simple extensions of previous technology.

Clearly, therefore, the mobile entertainment industry needs an portable, small form factor, secure storage technology to meet the growing demand for a portable, high-quality entertainment experience. In addition, it is anticipated that a storage device capable of holding large amounts of data would find application in other areas, such as in portable computers used in connection with the homeland security effort.

SUMMARY

This invention takes advantage of the fact that most mobile phones, PDAs and portable computers have wireless capability. In accordance with this invention, a miniature optical disc drive is provided with a wireless transceiver which allows it to send and receive data from an external source such as a mobile phone or PDA. The optical data is stored on a miniature optical disc, which typically contains prerecorded or premastered content but could also be recordable or re-recordable. The disc may be housed in a cartridge. The disc drive contains a cartridge loading mechanism, a drive unit, an optical head, an RF module, a battery power supply, possibly a controlling microprocessor, and printed circuits linking and controlling these components. The printed circuits may include a printed antenna for the RF link. The drive is housed in an RF-permeable material such as a polymer resin and preferably has dimensions that allow it to be stored in an ordinary shirt pocket. This drive is capable of providing wireless video, games and other information to a wide variety of smartphones, PDAs, ultra-light tablet and notebook computers, digital TVs and other multimedia devices. Such devices are hereafter referred to collectively as "host devices."

The wireless capability of the drive eliminates the need for a cable connection to the host device. This allows the device to reside in a user's briefcase or purse, for example, while the user views a movie or plays a game on a nearby host device.

Preferably, the disc drive is of a size that allows it to be easily held in a single hand or fit into a normal-sized shirt pocket. In one embodiment it has a "footprint" that measures 99 mm×48.5 mm and it is 17 mm thick. The cartridge loading mechanism holds a cartridge which contains a 32 mm optical disc.

The radio transmitter in the drive can transmit over a distance of about ten meters and has sufficient bandwidth to permit the transmission of video information. A frequency in the "unlicensed" part of the radio spectrum is used. For security reasons, the transmitted data are preferably encrypted. The data are decrypted in the host device with appropriate permissions and keys. Several users may receive data simultaneously from the disc drive. Preferably, the transmissions use a standard protocol such as WiFi.

Importantly, since the disc drive contains its own battery power supply, it does not deplete the internal battery of the host device while in operation. The battery may be charged while in the drive through an IO/charger port, or it may be charged in an external battery charger. Moreover, the power consumption from the battery in the disc drive is kept to a minimum by an efficient data encoding scheme with a high data transfer rate. For example, a two-hour movie can be stored in 1 GB of storage space using MPEG 4. If the host device has a 512 MB buffer memory, the disc needs to be spun up only twice for about 8 minutes each time to transfer data from the disc to the host device's buffer memory.

When not in use the drive may operate in a "sleep" mode for reduced power consumption. While in the sleep mode the drive may be awakened by a signal from the host device to start or resume operation.

DETAILED DESCRIPTION

Figure 1:
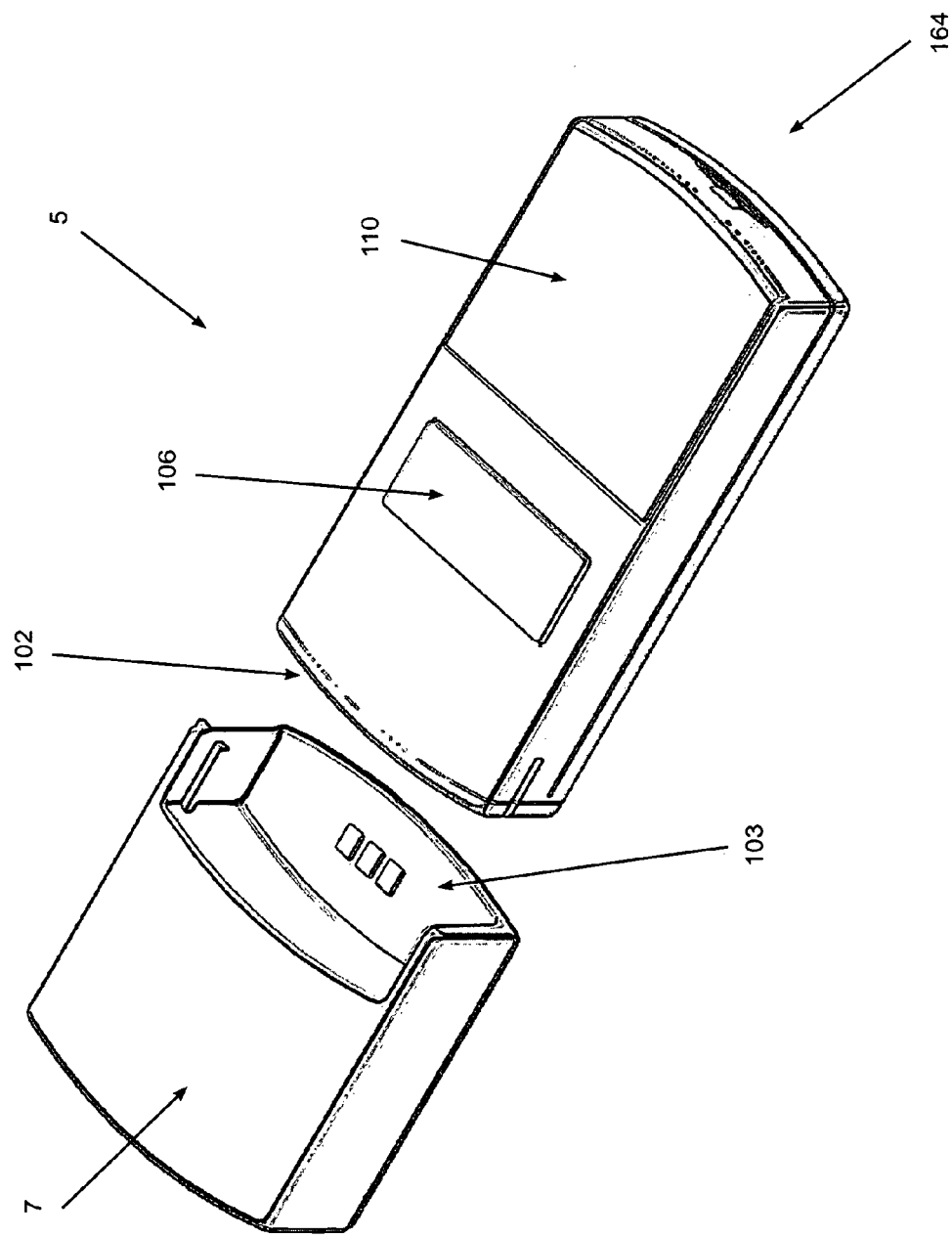
FIG. 1 is a perspective view of a disc drive and battery charger in accordance with the invention.
Figure 2:
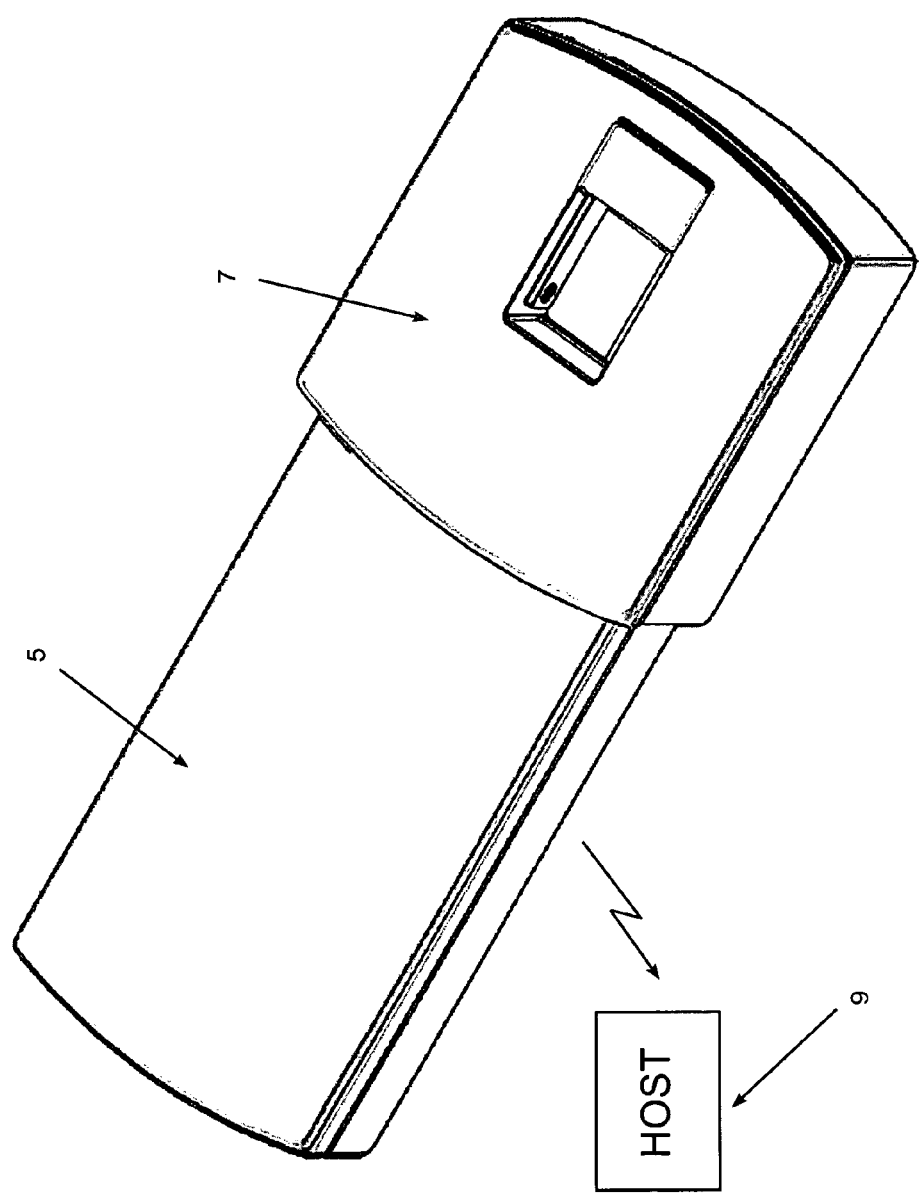
FIG. 2 shows the battery charger connected to the disc drive.

FIG. 1 is a general perspective view of a disc drive 5 in accordance with the invention. Disc drive 5 is encased in a housing 102 that is preferably made of a polymer resin. Disc drive 5 includes a liquid crystal display (LCD) unit 106, which may, for example, display an identification of the contents of a disc that has been loaded into disc drive 5. A drive access door 110 tilts upward to allow the insertion of a cartridge containing an optical disc (not shown) into disc drive 5. In one embodiment, disc drive 5 has a footprint which measures 99 mm×48.5 mm and it is 17 mm thick. Also shown is a battery charger 7, which may be connected to disc drive 5 to charge an internal battery (shown below). FIG. 2 shows battery charger 7 connected to disc drive 5. Battery charger 7 is preferably able to accept a 110-220V supply voltage and may deliver a 12V output, for example. FIG. 2 also shows a host device 9, which receives an RF signal from disc drive 5 on the WiFi (802.11) protocol. Host device 9 could be a "smartphone," a PDA, an ultra-light tablet or notebook computer, or a digital TV, for example. Host device 9 would typically contain a buffer memory.

Figure 3:
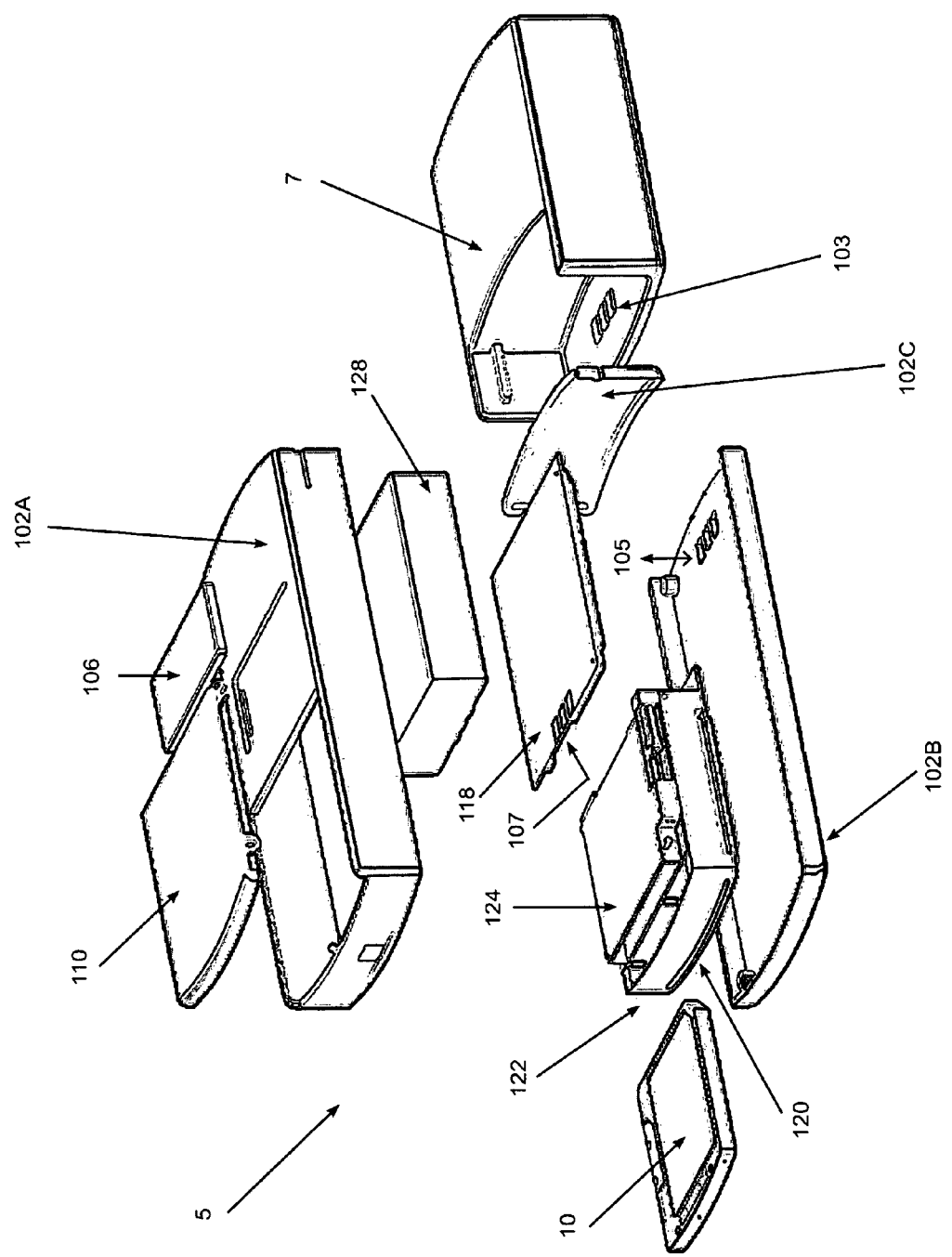
FIG. 3 is an exploded view of the disc drive.
Figure 4:
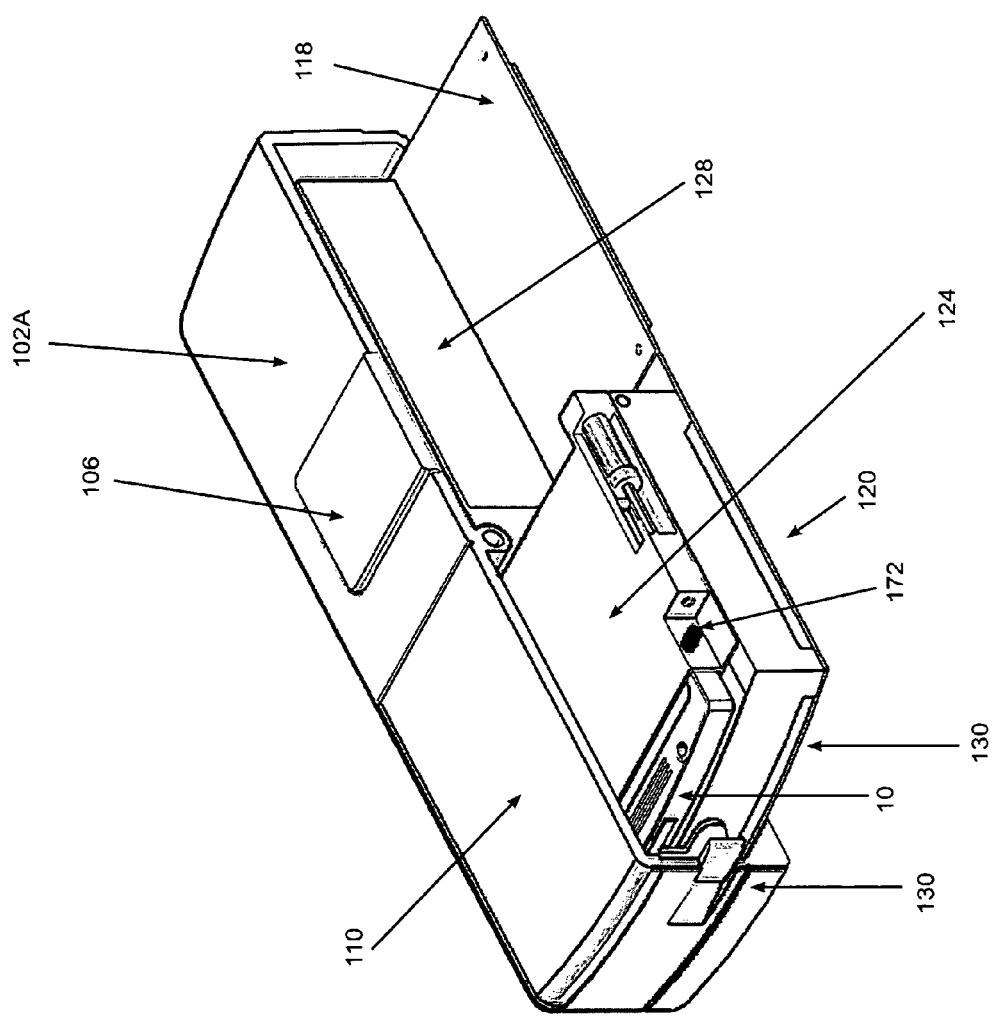
FIG. 4 is a cutaway view of the disc drive with drive access door closed.
Figure 5:
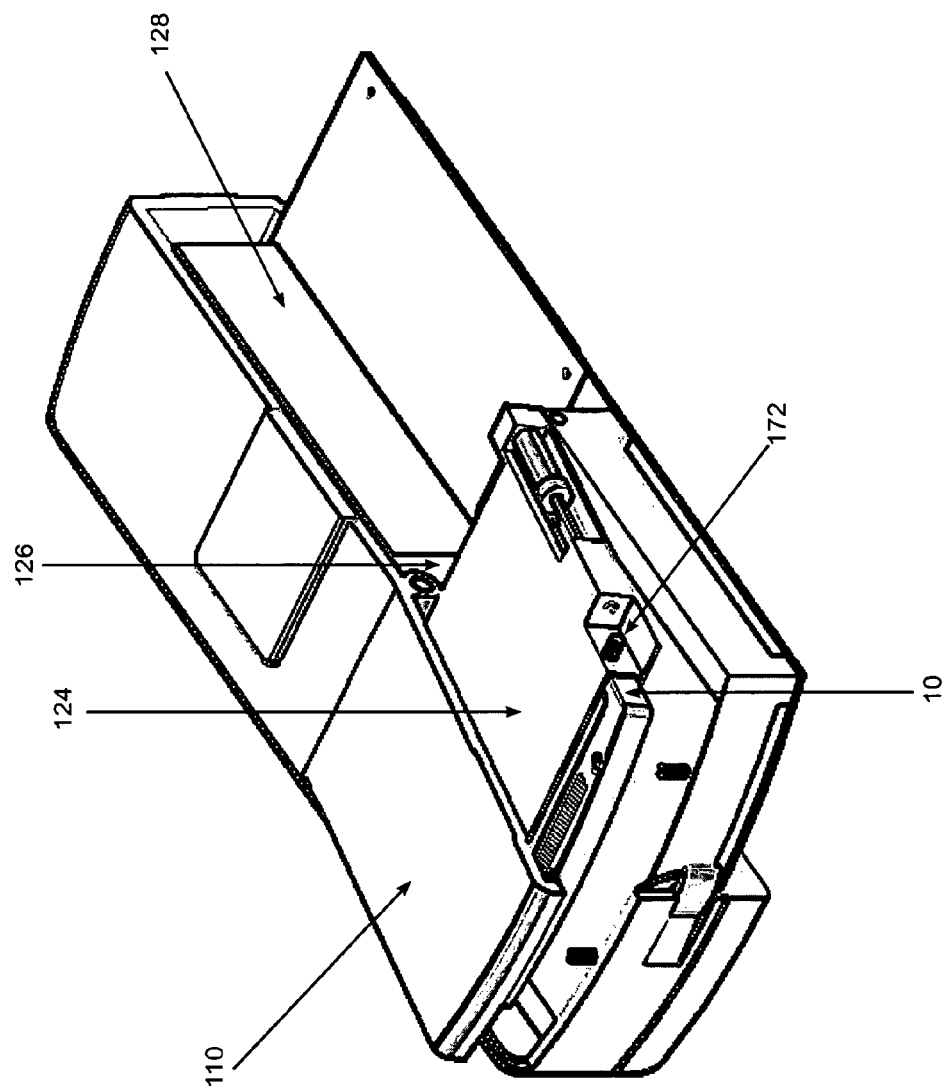
FIG. 5 is a cutaway view of the disc drive with the drive access door open.

The structure of disc drive 5 is described in greater detail in FIGS. 3 to 5. FIG. 3 is an exploded view and FIG. 4 is a cutaway view of disc drive 5. In addition to the components shown in FIG. 1, FIG. 3 shows that housing 102 includes a top cover 102A, a bottom cover 102B and a battery cover 102C. Above the bottom cover 102B are a WiFi player printed circuit board assembly (PCBA) 118 and an optical drive assembly 120. Optical drive assembly 120 contains an optical drive module 122 and a cartridge load module 124, into which an optical disc cartridge 10 can be inserted. A battery 128, which is preferably a lithium ion battery, is positioned above WiFi PCBA 118. Integrated circuit (IC) chips (not shown) which provide the wireless function are mounted on the underside of WiFi PCBA 118. Contacts 103 on battery charger 7 make contact with contacts 105 on disc drive 5. Contacts 107 on the surface on WiFi PCBA 118 are connected to contacts 105 by an internal power line (not shown) and in turn make contact with corresponding contacts (not shown) on the bottom of battery 128. In normal operation, battery 128 supplies all of the power needed to operate disc drive 5.

FIG. 5 is another cutaway view which shows how drive access door 110 tilts upward about a pivot shaft 126 to allow cartridge 10 to be inserted into or withdrawn from disc drive 5.

Figure 6:
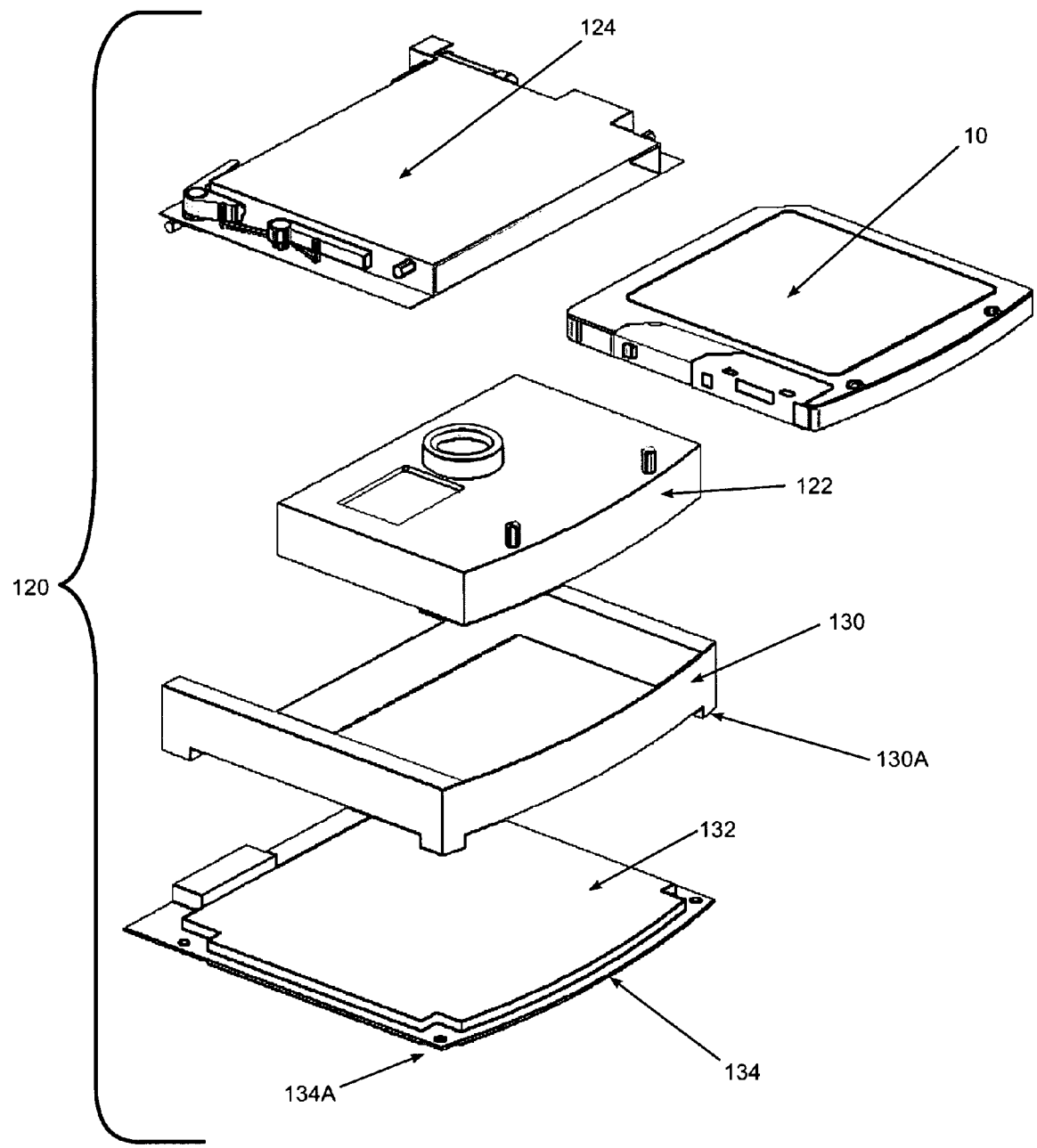
FIG. 6 is an exploded view of the optical drive assembly.
Figure 7:
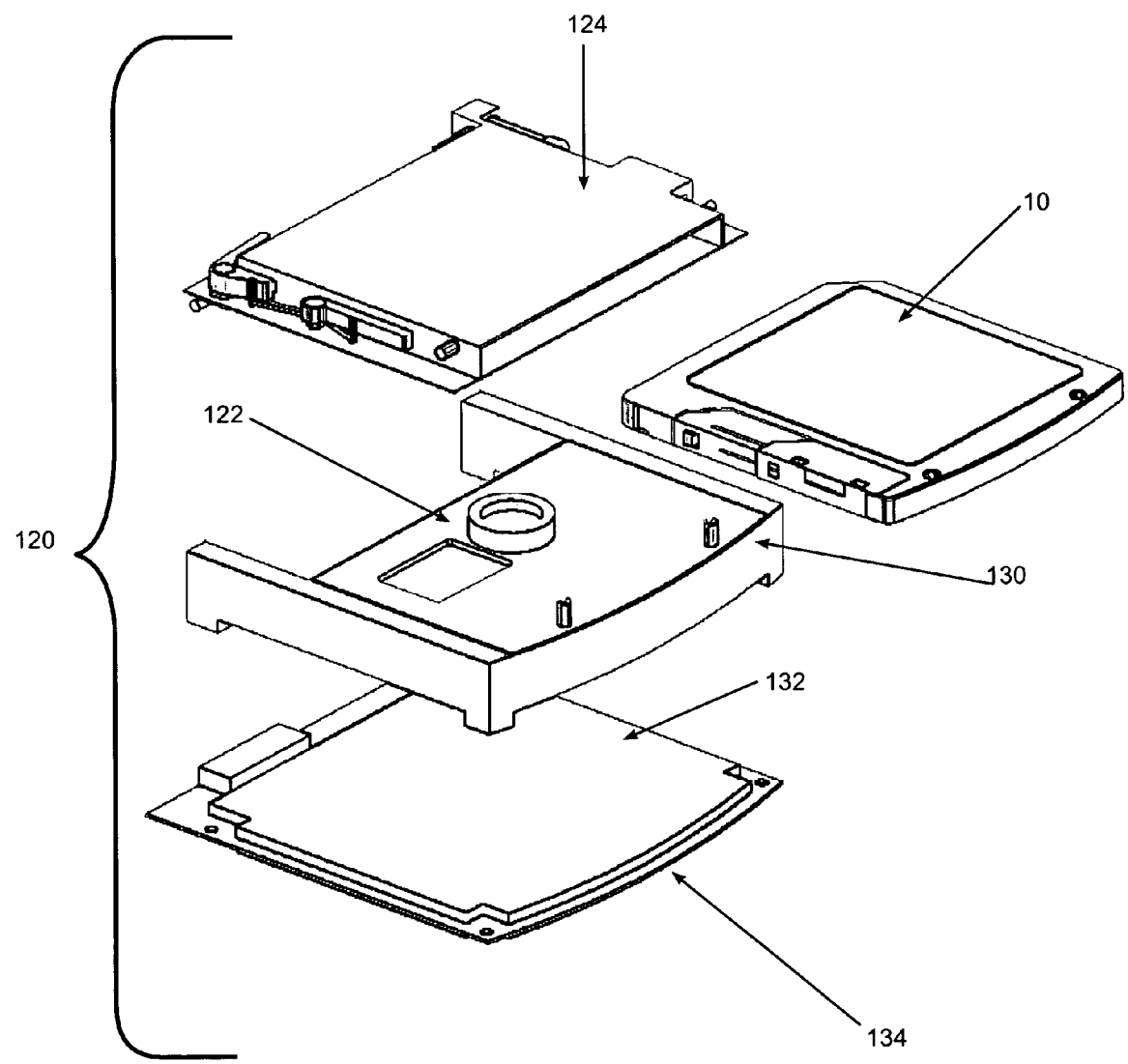
FIG. 7 is an exploded view of the optical drive assembly with the optical drive module mounted in the optical drive housing.

FIG. 6 illustrates the structure of optical drive assembly 120. Optical drive module 122 is mounted in an optical drive housing 130 above an optical drive PCBA 132. Optical drive module 122, optical drive housing 130 and optical drive PCBA 132 are held together by means of screws (not shown) that are threaded through holes 134A located near the corners of a bottom plate 134 and extend into optical drive housing 130. As shown, the corners of optical drive PCBA 132 are shaped to accommodate legs 130A of optical drive housing 130, thereby holding bottom plate 134 securely against optical drive housing 130. IC chips (not shown) that are part of the electronics used to drive optical drive module 122 are mounted on the top surface of optical drive PCBA 132. FIG. 7 illustrates how optical drive module 122 fits within a cavity in optical drive housing 130. Not shown is a connector which is used to make a connection between the IC chips mounted on optical drive PCBA and IC chips on the WiFi player PCBA (described below).

Optical Disc Cartridge

Figure 8A:
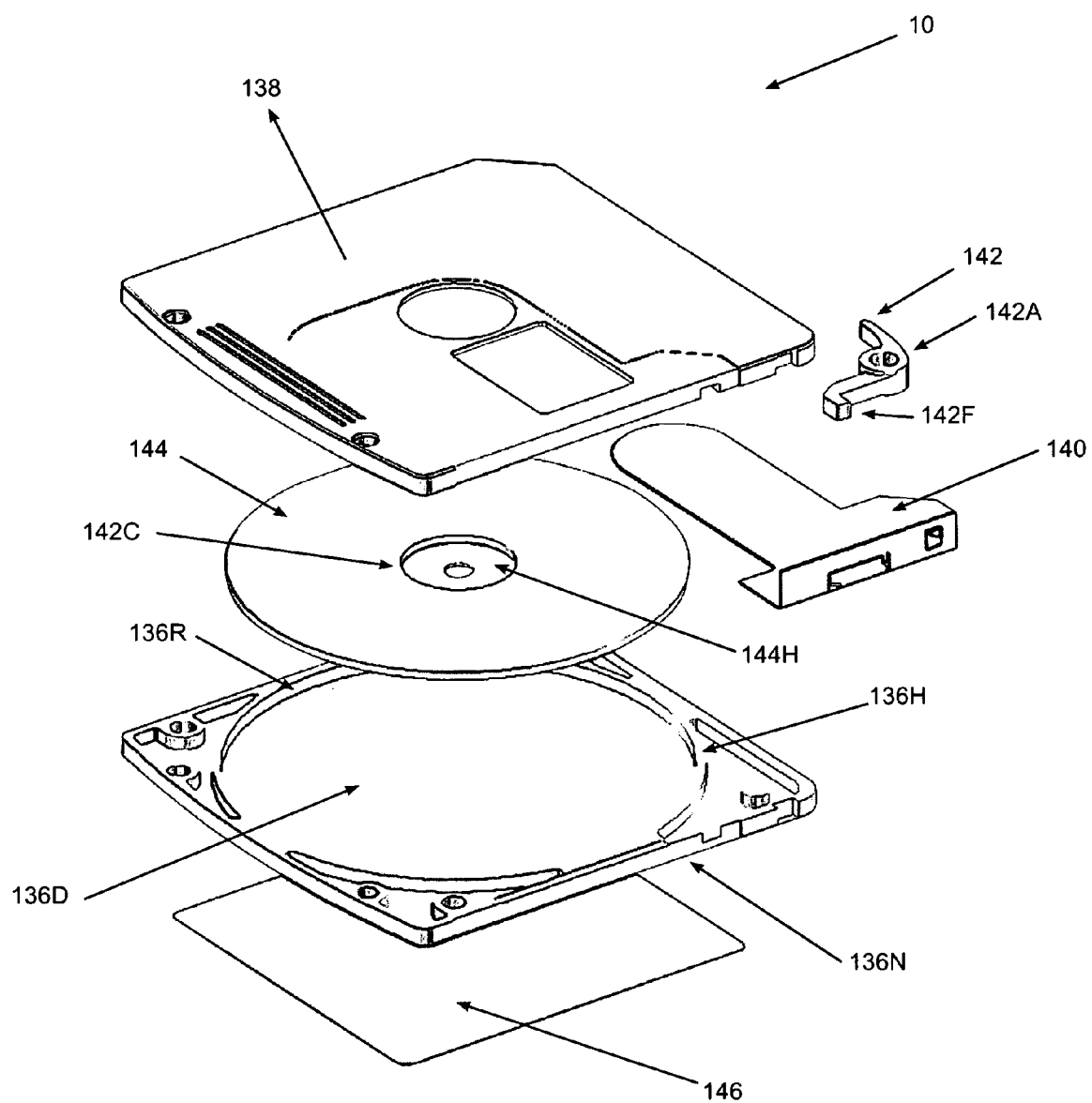
FIG. 8A is an exploded view of the cartridge upside down.
Figure 8B:
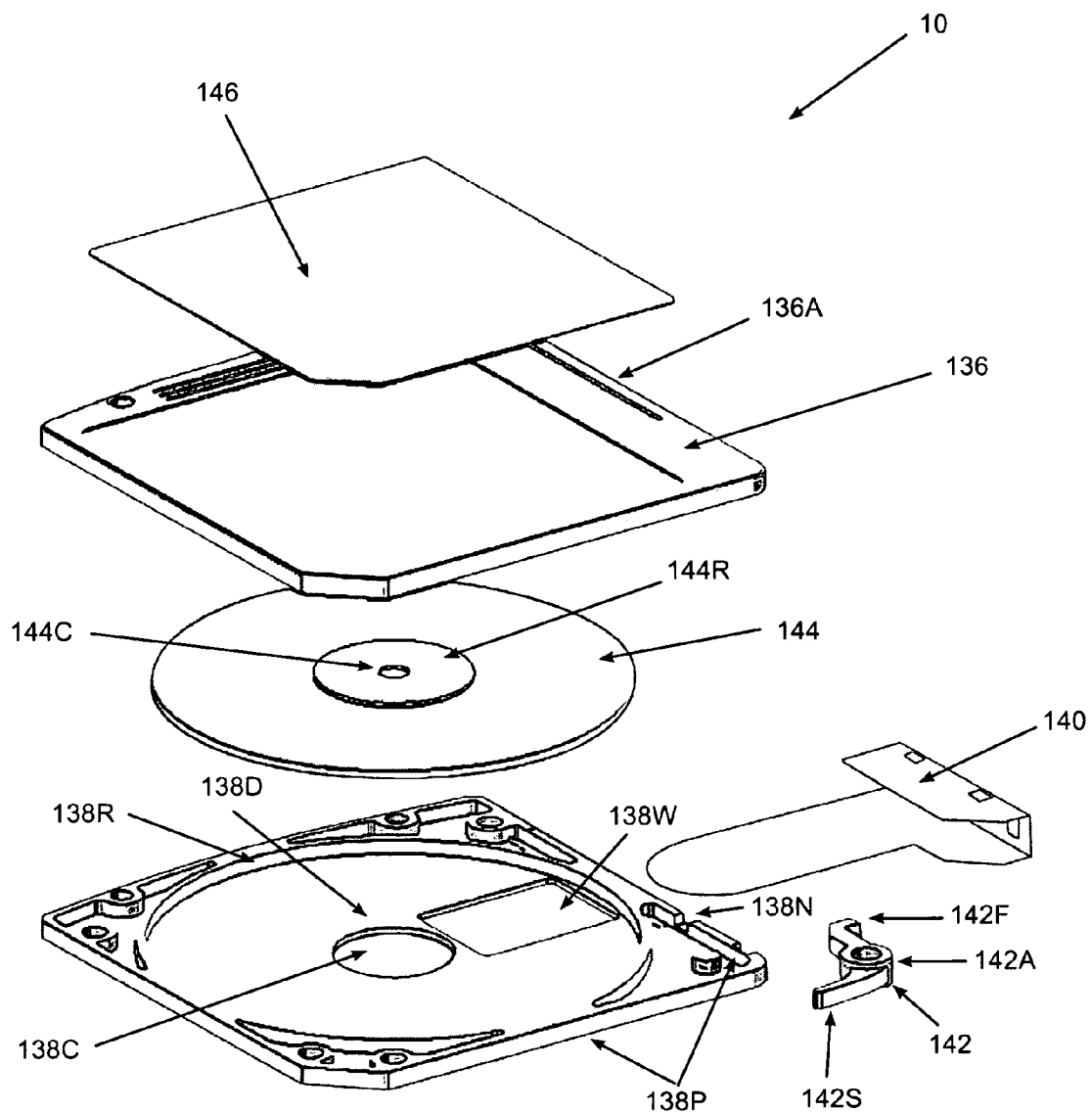
FIG. 8B is an exploded view of the cartridge right side up.

FIGS. 8A and 8B show exploded views of cartridge 10. FIG. 8A shows optical disc cartridge 10 from the side which includes the shutter (which is facing downward when disc 10 is loaded into disc drive 5). FIG. 8A thus shows cartridge 10 upside-down with respect to its orientation when loaded into drive 5. FIG. 8B shows cartridge 10 with its shutter side-facing downward, which is how it is oriented when loaded into drive 5.

Cartridge 10 includes an upper shell 136, a lower shell 138, a shutter 140, a shutter latch 142 and an optical disc 144. Shells 136 and 138 may be formed of plastic. An optional product label 146 is affixed to upper shell 136. Upper shell 136 has a circular depression 136D, defined by a circular rim 136R, which mates with a similar circular depression 138D, defined by a circular rim 138R, in lower shell 138 to form a circular cavity which holds optical disc 144 when shells 136 and 138 are bonded together. When disc 144 is housed in this circular cavity, it is free to rotate when the edges of its central hole are engaged by a chuck associated with the spindle drive motor (described below). A retention ring 144R, formed of a magnetic metal, is bonded to the side of disc 144 that faces upper shell 136. The optical data, which are stored on the side of disc 144 that faces lower shell 138, are read through an optical pickup access port 138W in lower shell 138.

Optical disc 144 must be small enough to maintain the miniature dimensions of disc drive 5. In one embodiment, optical disc 144 is 32 mm in diameter.

Shutter latch 142 is formed of a resilient plastic material and contains a circular aperture 142 A, a pressure surface 142S and a latch finger 142F. Shells 136 and 138 contain posts 136P and 138P, respectively, which mate to form a single post over which circular aperture 142A fits when shells 136 and 138 are bonded together. Posts 136P and 138P are formed in depressions near the corners of shells 136 and 138, which together create a compartment for shutter latch 142 when shells 136 and 138 are bonded together. Notches 136N and 138N are formed in the external walls of shells 136 and 138, respectively. When shutter latch is mounted in this fashion, pressure surface 142S abuts an internal wall of the compartment, and latch finger 142F projects into an opening formed by notches 136N and 138N. A slight flexing of the shutter latch 142 maintains latch finger 142F in the opening formed by notches 136N and 138N.

Figure 9A:
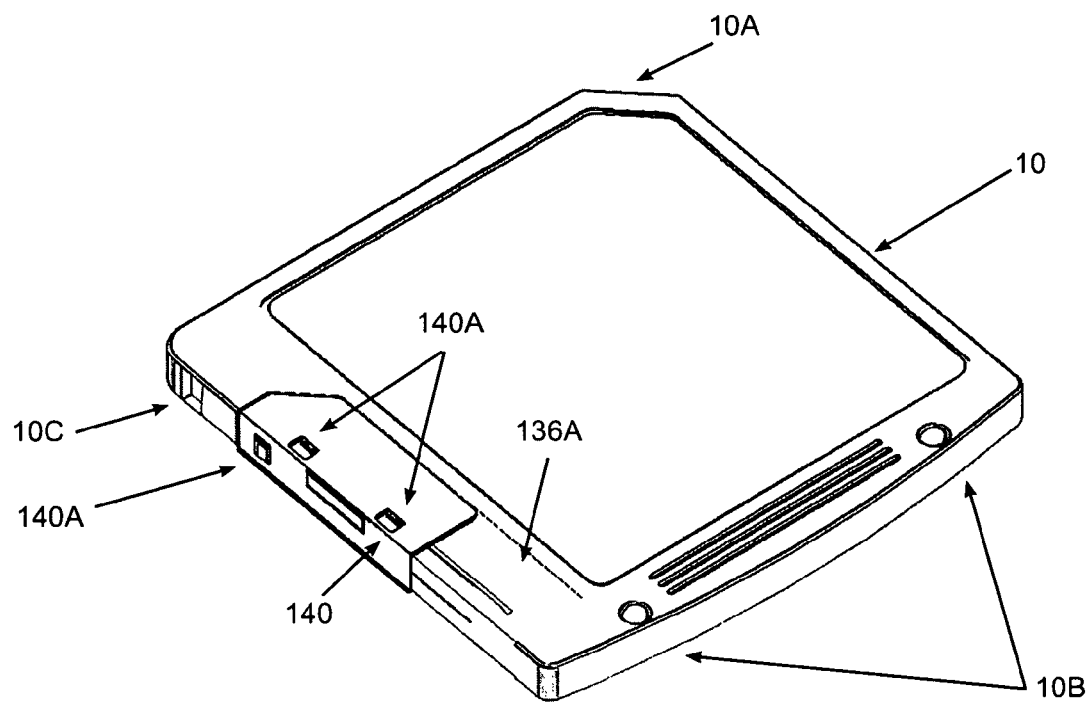
FIGS. 9A and 9B are perspective views of the cartridge.
Figure 9B:
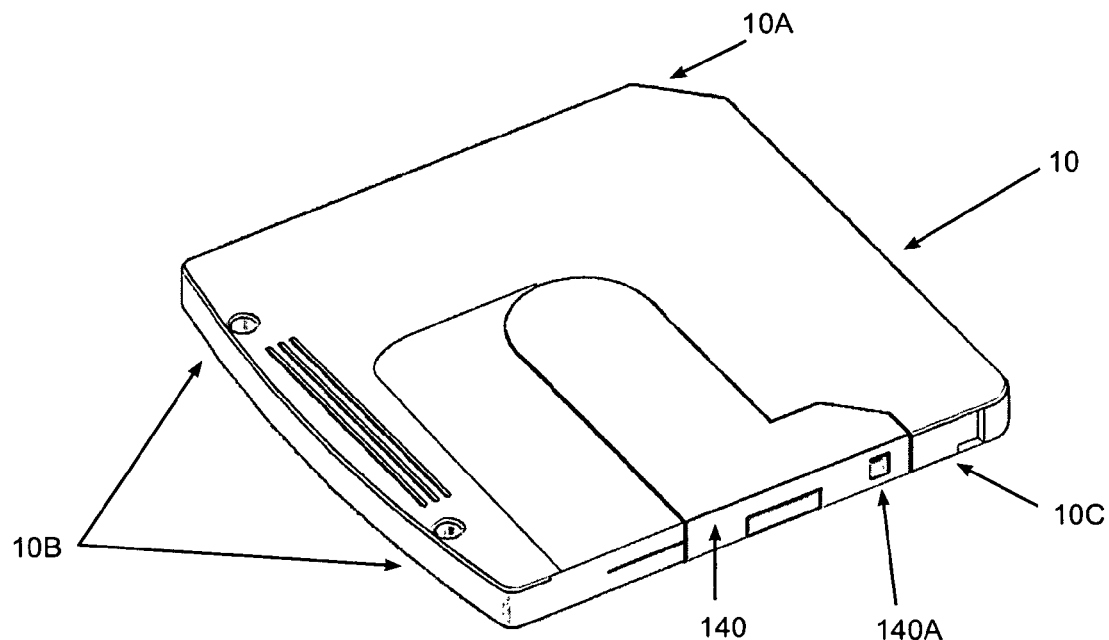

Referring to FIGS. 9A and 9B, which show the assembled cartridge 10, shutter 140 slidingly grips an edge of cartridge 10. As shown in FIG. 9A, openings 140B are formed in shutter 140. Shutter 140 is preferably formed of a piece of sheet metal (e.g., 0.1 mm thick). Openings 140B are stamped in the sheet metal, and in that process metal flanges (not shown) are formed which project into a longitudinal track 136A that runs adjacent to the edge of cartridge 10. Shutter 140 is thereby retained on the edge of cartridge 10. When shutter 140 is in the closed condition, shown in FIGS. 9A and 9B, an aperture 140A in shutter 140 is aligned with notches 136N and 138N. Accordingly, latch finger 142F projects through aperture 140A, locking shutter 140 in the closed position. When shutter latch 142 is released (as described below) shutter 140 is free to slide in the direction indicated by the arrow in FIG. 9A to expose central hole 138C and optical pickup access port 138W of lower shell 138.

Also shown in FIGS. 9A and 9B are registration holes 10B, which serve to align cartridge 10 properly when it has been fully loaded into disc drive 5. A retainer notch 10C is formed on an edge of cartridge 10.

Cartridge Load Unit

FIGS. 10 to 14 illustrate the loading of cartridge 10 into cartridge load module 124. As shown in FIG. 10B, cartridge load module 124 includes a cartridge load sleeve 154, which in turn is formed of a base plate 158 and a cover 156. Mounted rotatably on base plate 158 are a shutter actuator pick 148 and a cartridge retainer 150. A tension spring 152 provides a bias against both shutter actuator pick 148 and cartridge retainer 150, maintaining them normally in the positions shown in FIG. 10B. Shutter actuator pick 148 and tension spring 152 are mounted in common on a post 160 and cartridge retainer 150 is mounted on a post 162, posts 160 and 162 extending upward from base plate 158. Shutter actuator pick 148 is pressed against a wall of cover 156, and a prong 148P of shutter actuator pick 148 projects inward through an opening in the wall of cover 156. Prong 148P is shown in FIG. 14B (with cover 156 removed). Cartridge retainer 150 has a prong 150P, also shown in FIG. 14B, which projects inward through a second opening in the wall of cover 156.

Figure 11A:
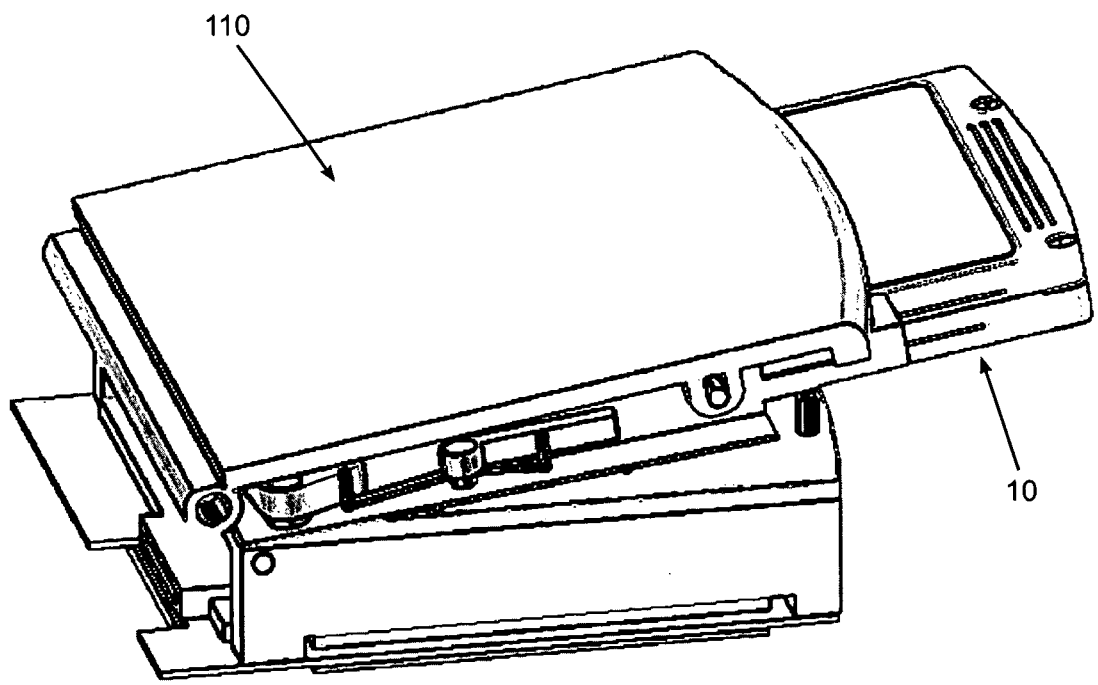
FIGS. 11A-11D show the cartridge after it has been partially inserted into the cartridge load module.
Figure 11B:
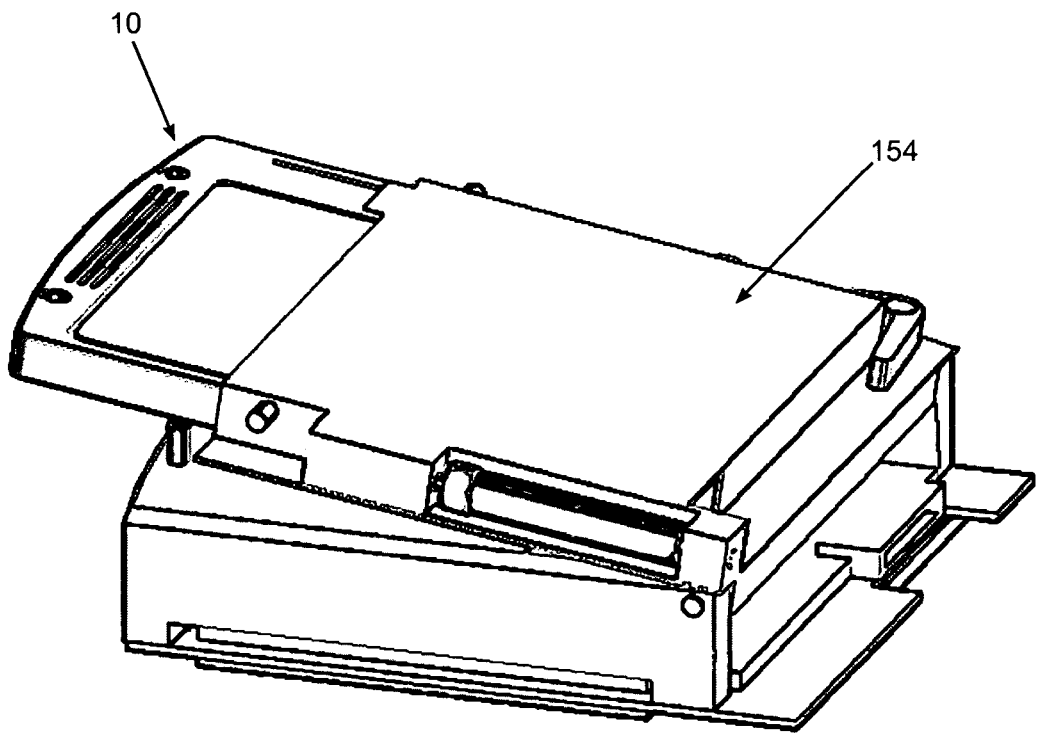
Figure 11C:
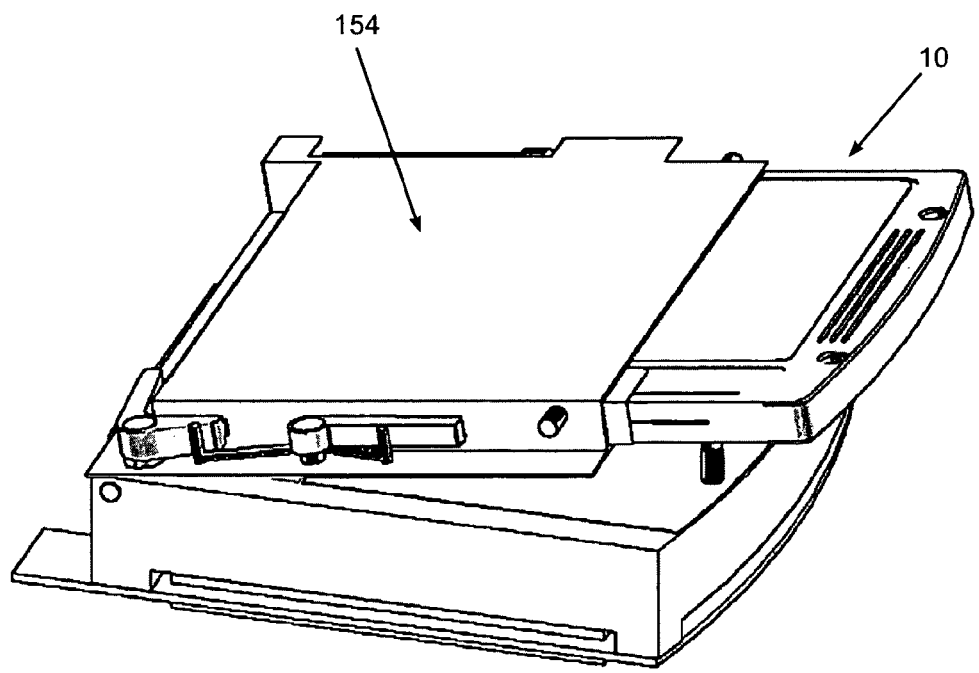
Figure 11D:
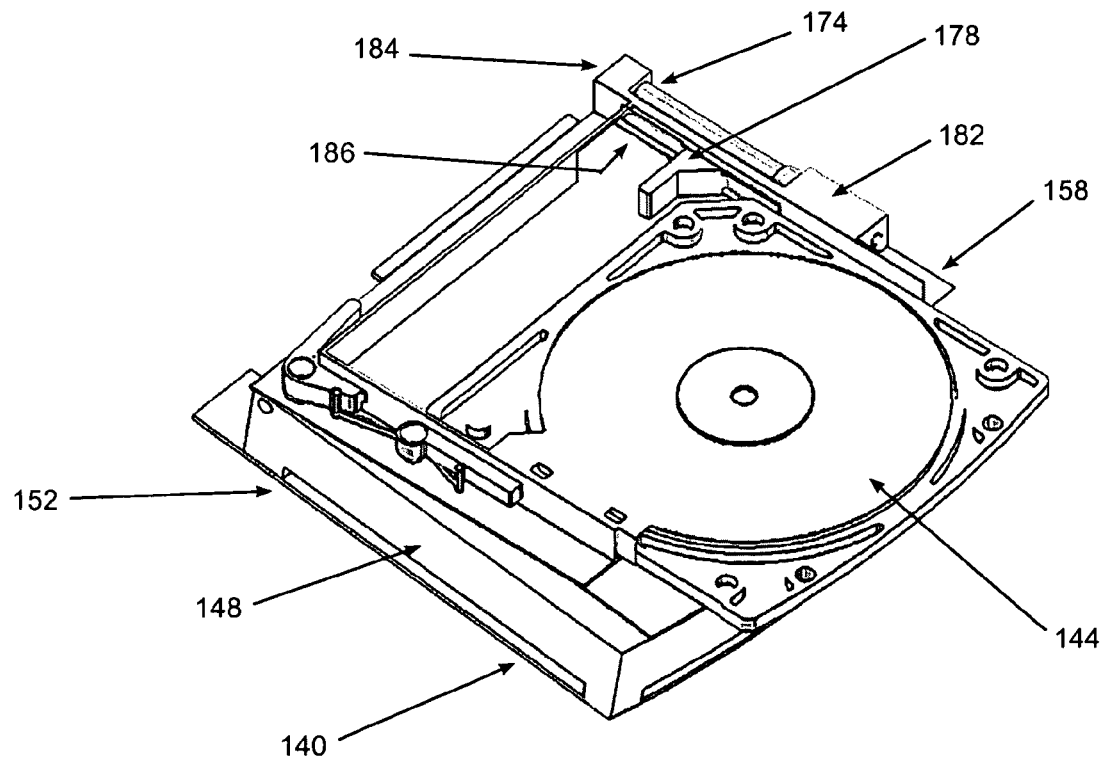
Figure 14A:
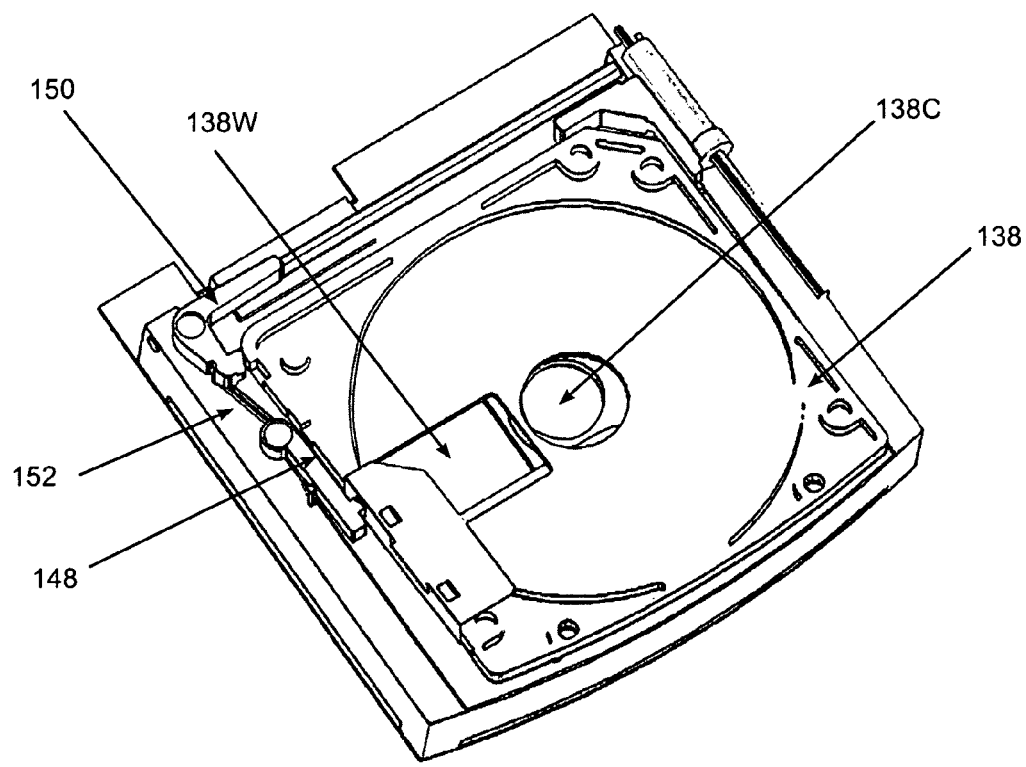
FIGS. 14A-14D show the cartridge after it has been fully inserted into the cartridge load module with the drive access door closed.
Figure 14B:
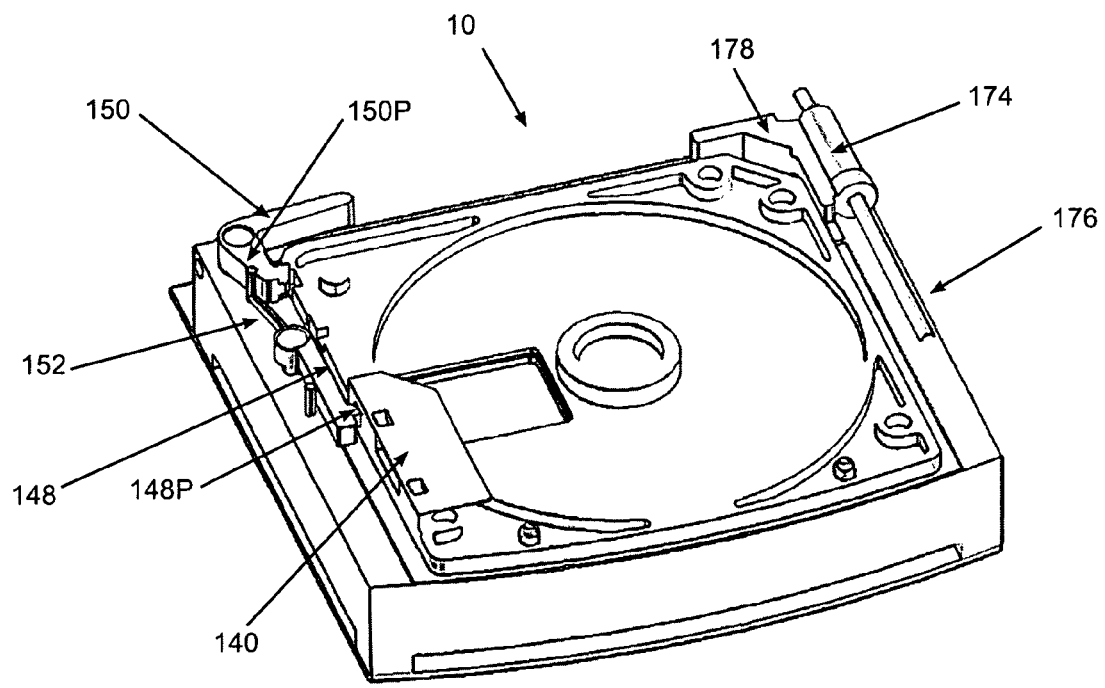

Referring to FIGS. 11D and 14B, cartridge load module 124 contains a cartridge ejector 178 which slides on a rod 176. Rod 176 extends between anchor blocks 182 and 184, which are affixed to base plate 158. Coiled around rod 176 is a compression spring 174. Cartridge ejector 178 slides in a slot 186 that is formed in a wall of cartridge load sleeve 154 between a forward position (shown in FIG. 11D) and a retracted position (shown in FIG. 14B). In the forward position, compression spring 174 is relaxed, in the retracted position, compression spring 174 is compressed.

Figure 10A:
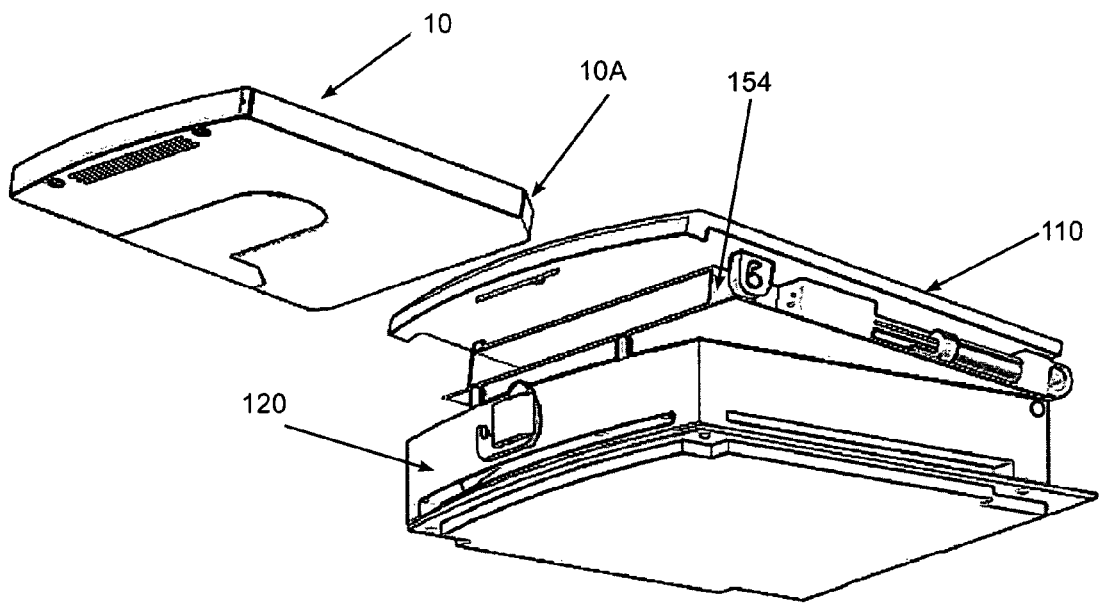
FIGS. 10A-10C show a cartridge immediately before loading into the cartridge load module.

The cartridge load/unload process will now be described. Drive access door 110 is normally in the closed position shown in FIGS. 1 and 4. To load cartridge 10, the user releases a latch 164. Since access door 110 is spring-biased towards the open position, releasing latch 164 causes drive access door 110 and cartridge load sleeve 154 to tilt upward, as shown in FIGS. 5 and 10A. As shown in FIG. 13B, drive access door 110 pivots about a shaft 166 that extends between the walls of top cover 102A, and cartridge load sleeve 154 pivots about a shaft 168 that is part of optical drive housing 130. Still referring to FIG. 13B, a pair of slotted members 170 project downward on the underside of drive access door 110, and pins 172 project outward from the sides of cartridge load sleeve 154. Pins 172 are also shown in FIGS. 4 and 5.

Figure 10B:
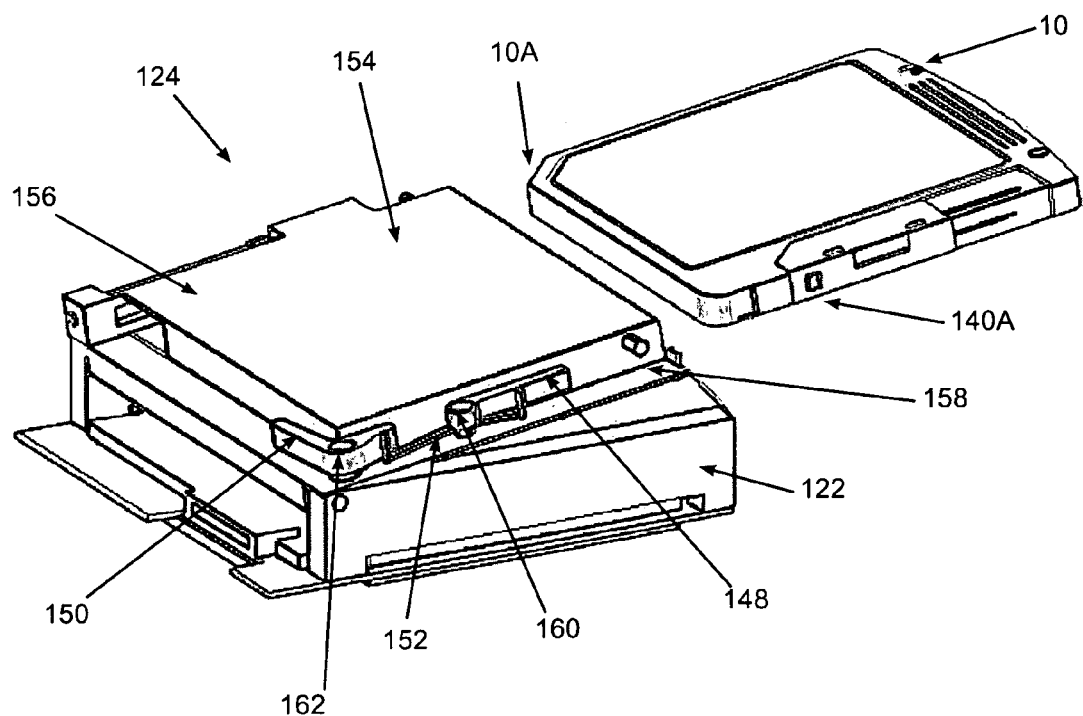
Figure 10C:
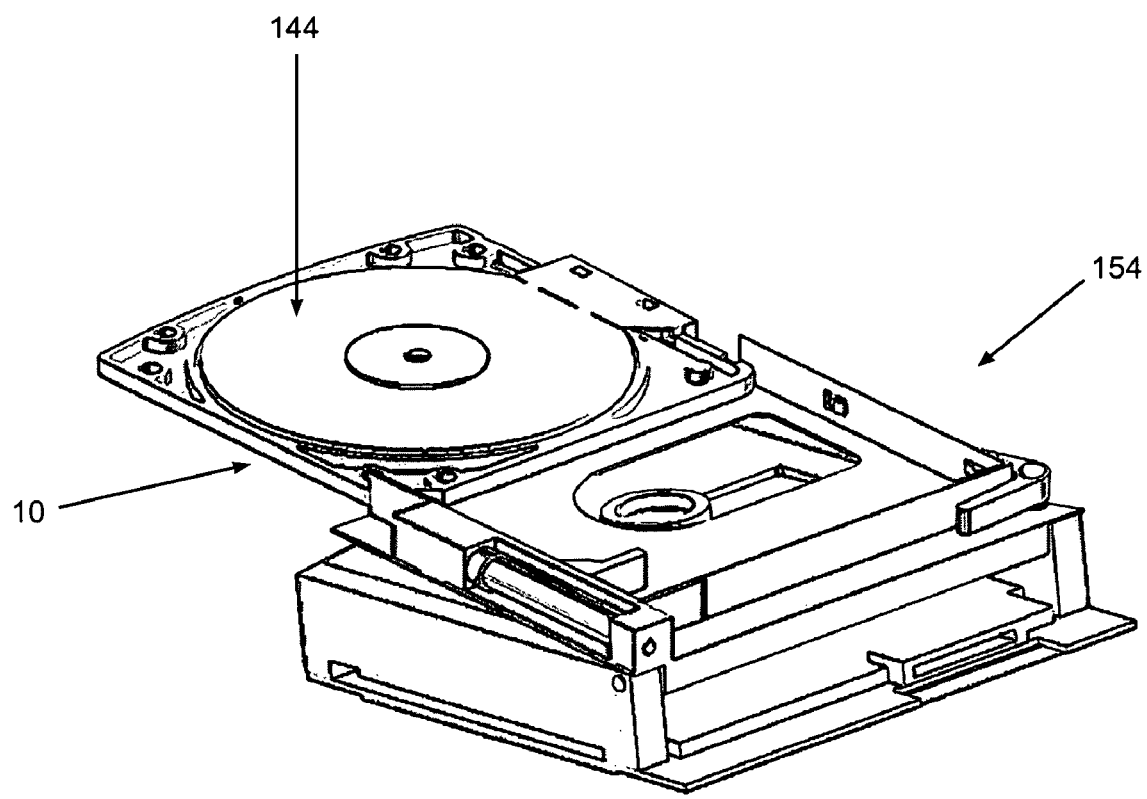

As drive access door 110 tilts upward, pins 172 slide in the slots of slotted members 170, exposing the entrance to cartridge load sleeve 154. Cartridge 10 can then be inserted into cartridge load sleeve 154. FIGS. 10A to 10C show cartridge 10 in the ready-to-load position, next to the entrance to cartridge load sleeve 154. In FIG. 10B, drive access door 110 has been removed to expose the external structure of cartridge load sleeve 154, and in FIG. 10C cover 156 of cartridge load sleeve 154 and upper shell 136 of cartridge 10 have been removed to show the internal structure of cartridge load sleeve 154 and cartridge 10 (including optical disc 144). As shown in FIGS. 9 and 10, cartridge 10 has a truncated corner 10A, which prevents cartridge 10 from being inserted backwards or upside down into cartridge load sleeve 154.

FIGS. 11A to 11D show cartridge 10 partially inserted into cartridge load sleeve 154. FIGS. 11B and 11C are with drive access door 110 removed, and FIG. 11D is with cover 156 of cartridge load sleeve 154 and upper shell 136 of cartridge 10 removed. Referring to FIG. 11D, in this position shutter 140 is still closed, but shutter actuator pick 148, via prong 148P (not shown), has engaged aperture 140A in shutter 140. Urged by tension spring 152, shutter actuator pick 148 overcomes the resilient force of shutter latch 142, forcing latch finger 142F out of aperture 140A and freeing shutter 140 to open.

Figure 12A:
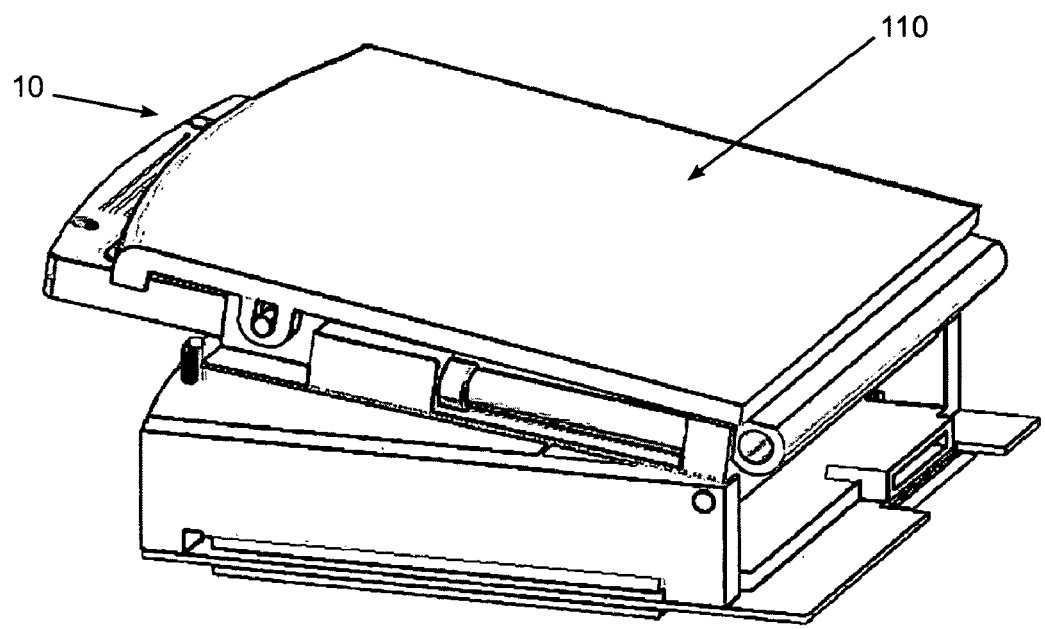
FIGS. 12A and 12B show the cartridge when it is almost fully inserted into the cartridge load module.
Figure 12B:
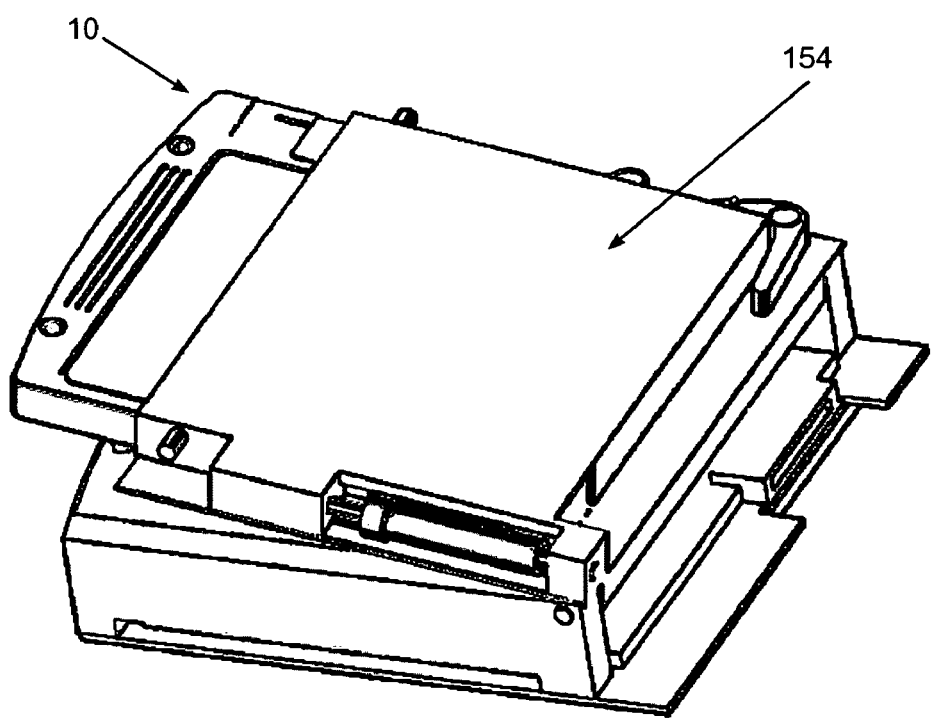

FIGS. 12A and 12B show the arrangement after cartridge 10 has been inserted slightly further. Although shutter actuator pick 148 has begun to open shutter 140 by sliding it forward in track 136A, this is not visible in FIGS. 12A and 12B.

Figure 13A:
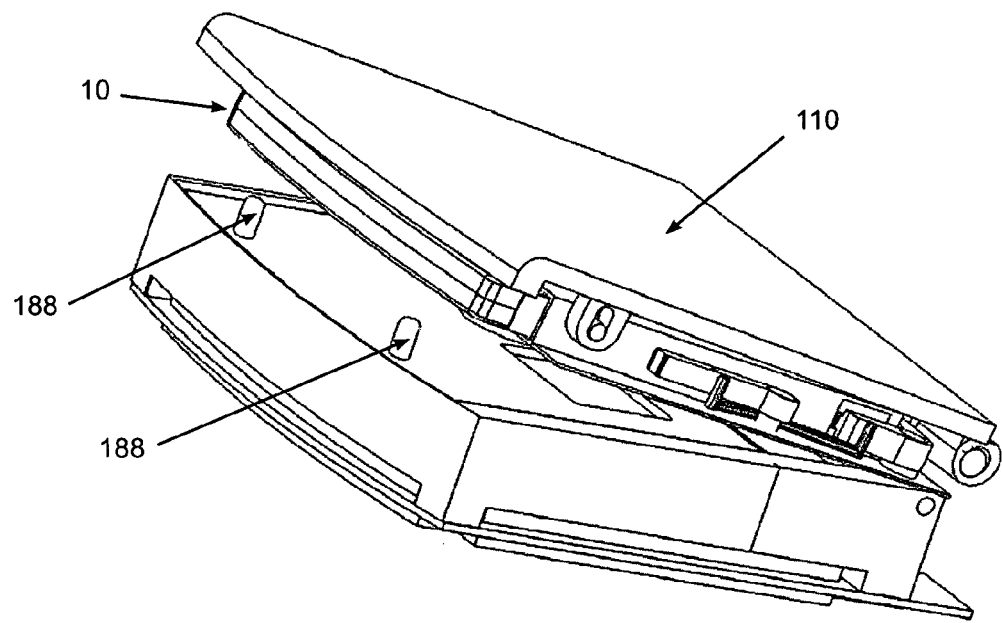
FIGS. 13A-13C show the cartridge after it has been fully inserted into the cartridge load module with the drive access door still open.
Figure 13B:
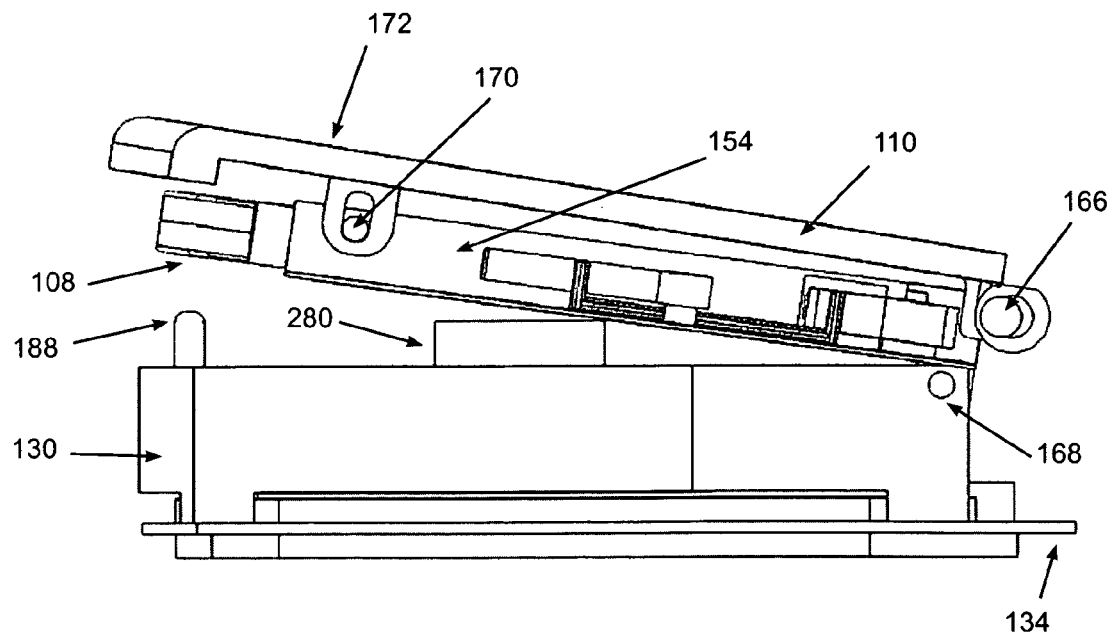
Figure 13C:
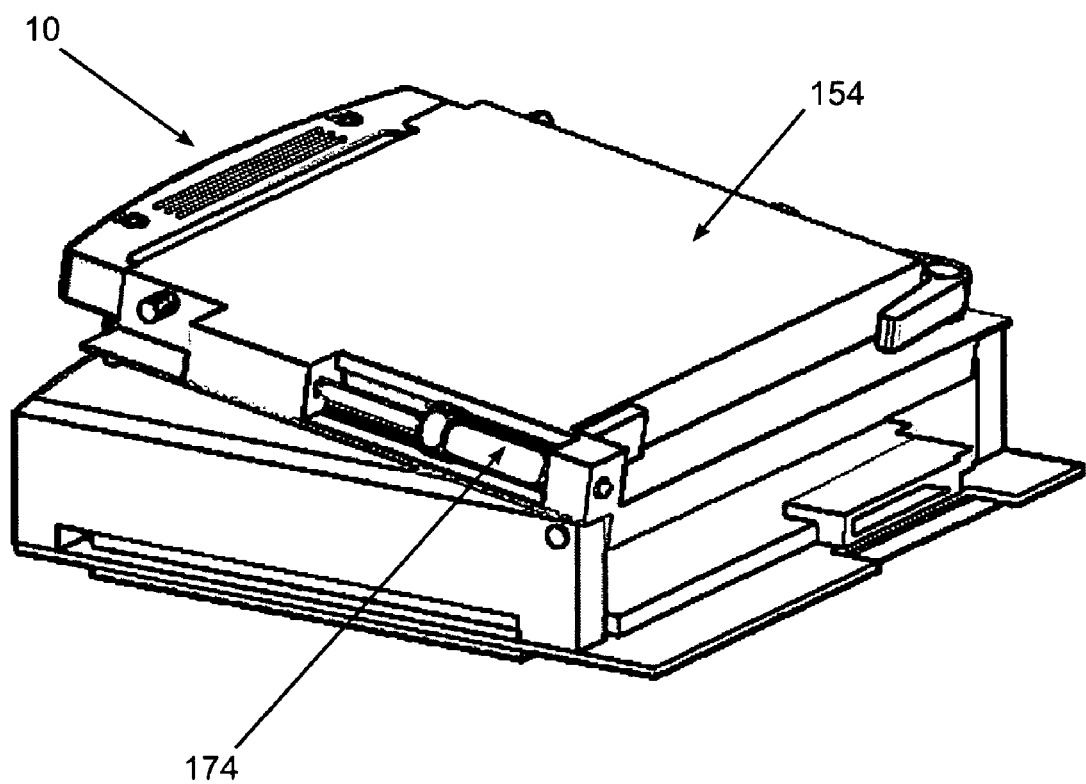

FIGS. 13A to 13C show cartridge 10 after it has been fully inserted into cartridge load sleeve 154 with drive access door 110 is still open. In this position, shutter 140 has been fully opened, exposing central hole 138C and optical pickup access port 138W of cartridge 10. A cartridge retainer 150 (described below) engages a notch in cartridge 10 with a prong 150P to hold cartridge 10 in cartridge load sleeve 154. Registration pins 188 project upward from optical drive module 122 to engage registration holes 10B in cartridge 10 when drive access door 110 is closed, firmly and properly positioning cartridge 10 for reading the data stored on optical disc 144. A spindle assembly 280 extends upward from optical drive module 122, ready to engage a central hole of optical disc 144 (described below).

Registration pins 188 are "bullet nose" pins. The radius cut onto the flanks of the insertion point is equal to the diameter of the pin. This shape offers a maximum acquisition zone for insertion into a registration hole 10B and a minimum opportunity for binding or balking on insertion.

Figure 14C:
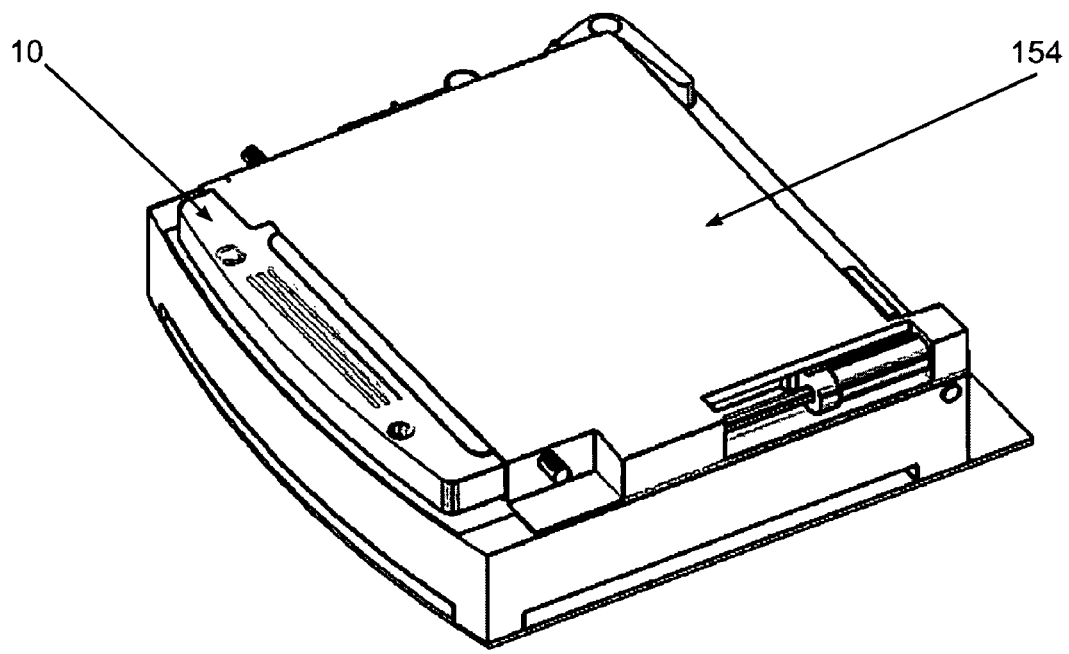
Figure 14D:
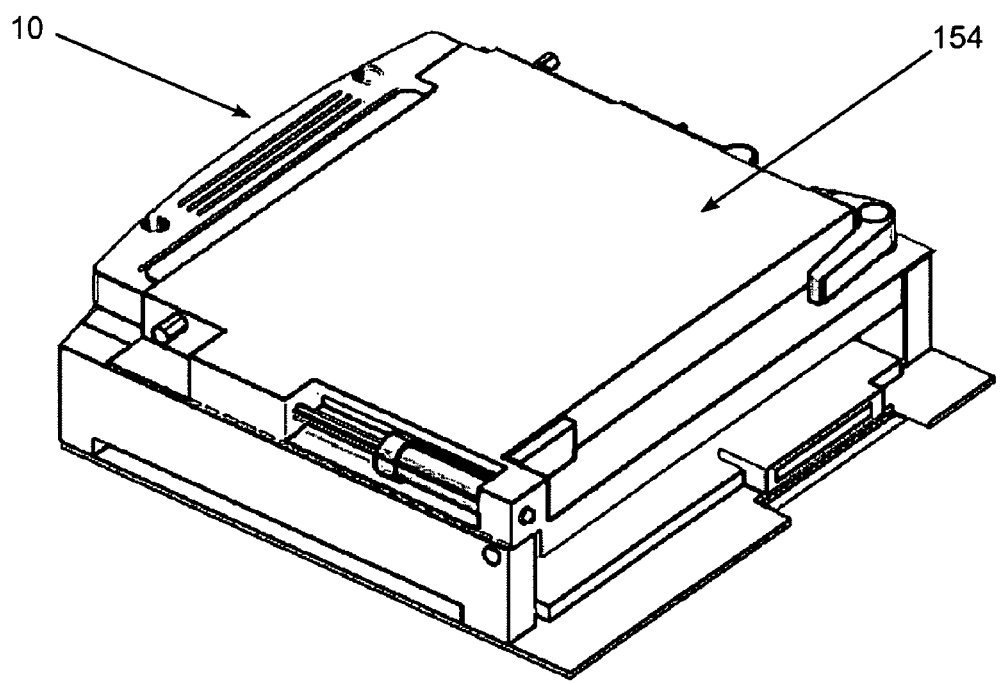

After cartridge 10 has been fully inserted in cartridge load sleeve 154, as shown in FIGS. 13A to 13C, the user presses downward on drive access door 110, against the force of the pivot spring, to engage latch 164. Latch 164 is spring-loaded and snaps into a locked condition when drive access door 110 is fully closed. The pivot spring that biases drive access door 110 is cocked so that it will open drive access door 110 the next time that latch 164 is released. The situation at this point is shown in FIGS. 14A to 14D. FIGS. 14A and 14B are with cover 156 of cartridge load sleeve 154 and upper shell 136 of cartridge 10 removed, and FIGS. 14C and 14D are with drive access door 110 removed.

Referring to FIGS. 14A and 14B, shutter actuator pick 148 has pushed shutter 140 to the open position, exposing central hole 138C and optical pickup access port 138W. The leading edge of cartridge 10 has pushed cartridge ejector 178 backward, against the force of compression spring 174, the truncated corner 10A of cartridge 10 abutting a canted surface of cartridge ejector 178. Prong 150P of cartridge retainer 150 has engaged retainer notch 10C on the edge of cartridge 10, retaining cartridge 10 in cartridge load sleeve 154. As drive access door 110 is closed, spindle assembly 280 engages the central hole of optical disc 144.

To remove cartridge 10, the user releases latch 164. The pivot spring opens drive access door 110, which via slotted members 170 lifts cartridge load sleeve 154 upward, disengaging cartridge 10 from registration pins 188 and optical disc 144 from spindle assembly 280. A cam (not shown) on the underside of drive access door 110 causes cartridge retainer 150 to release cartridge 10. As cartridge 10 is released, compression spring 174 (which is in the compressed condition) actuates cartridge ejector 178, which pushes cartridge 10 outward. A detent (not shown) on cartridge load sleeve 154 engages a small indentation on cartridge 10 to prevent cartridge 10 from being "launched" from disc drive 5.

Drive Module

FIGS. 15-28 are views of the components of the optical drive module 122.

Figure 15:
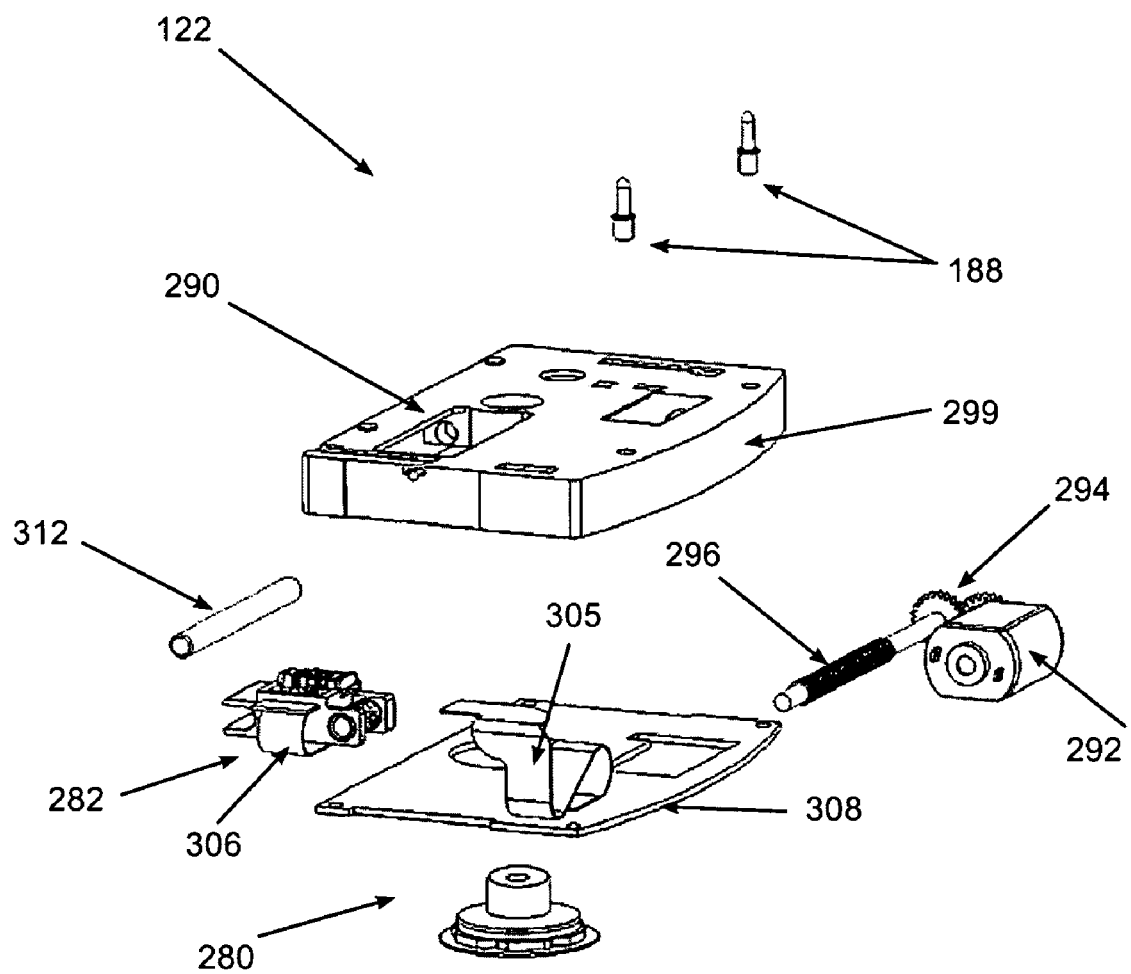
FIG. 15 is an exploded view of the optical drive module.

Referring to FIG. 15, the components of optical drive module 122 are mounted in a body member 299, which can be made of a metal such as aluminum or magnesium or a plastic resin such as a liquid crystal polymer having a Young's modulus of at least $2.8 \times 10^4$ MPa ($4.4 \times 10^6$ psi). A data access opening 290 is formed in body member 299. Optical drive module 122 contains a spindle assembly 280 and an optomechanical carriage assembly 282, which slides along a rail 312. Spindle assembly 280 engages the central hole of disc 144. As described below, optomechanical carriage assembly 282 contains a laser diode, a lens and other components for reading data from optical disc 144 through data access opening 290.

Also shown in FIG. 15 is a lead screw 296 that is used to provide coarse positioning for the laser beam that emanates from optomechanical carriage assembly 282. Lead screw 296 is driven by a carriage drive (coarse tracking) motor 292 through a two-stage gear reduction unit 294. Anti-backlash gears may be used in the drive train. The bearing elements for lead screw 296 preferably contain at least one pre-loaded pair of ball bearings to keep friction low, but eliminate backlash in the motion of lead screw 296 along its axis of rotation. A flexible interconnect 305 connects optical drive PCBA 132 (FIG. 6) to a PCBA 308, and a flexible interconnect 306 connects PCBA 308 to optomechanical carriage assembly 282. ZIF connectors on either or both of PCBAs 132 and 308 may be used to facilitate assembly.

To service the motion of optomechanical carriage assembly 282 along the tracking path, flexible interconnect 306 forms a single loop between the tail of carriage assembly 282 and PCBA 308. The carriage end of flexible interconnect 306 is connected to a laser/detector package for signal and data transfer, and to a fine servo motor to control focus and tracking. In an implementation using a linear motor, it would also carry the coarse motor current. Again, a ZIF connector on the PCBA 308 can be used to facilitate assembly.

A short flexible interconnect (not shown) may be used to connect coarse tracking motor 292 to PCBA 308, although discrete wires or formed motor terminals could also be used.

Figure 16:
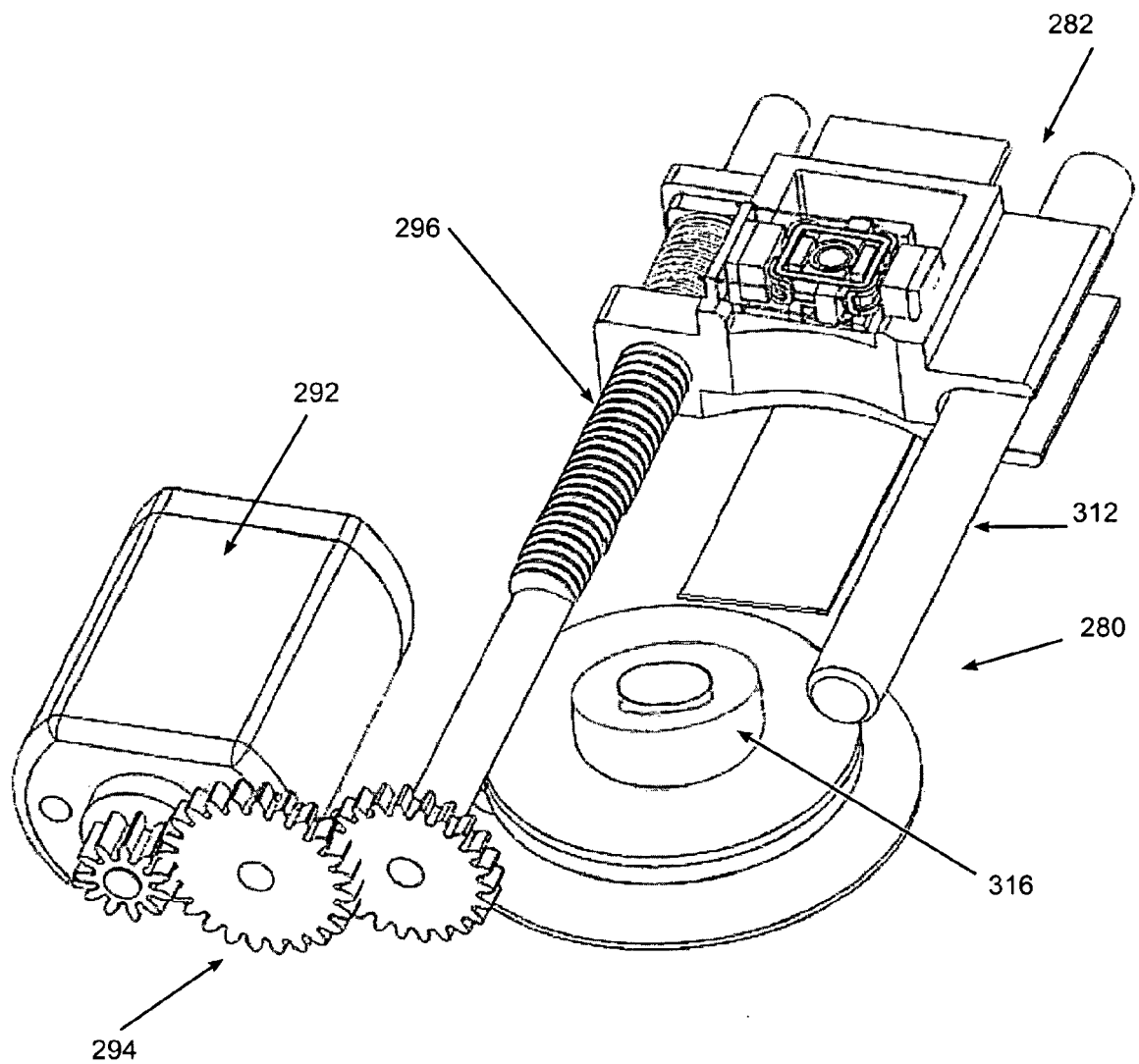
FIG. 16 is a perspective view of the carriage drive (coarse tracking) motor, the optomechanical carriage assembly and the spindle assembly.

The coarse tracking mechanism and spindle assembly 280 are shown in FIG. 16. Coarse tracking motor 292 is a brush-type, reversible DC motor, such as a Canon model DN06-V*N*B, although a stepper motor or brushless DC motor could also be used. Among the factors that determine the choice of motor are bandwidth, power consumption, cost, reliability and durability.

Lead screw 296 and optomechanical carriage assembly 282 may be coated with or made from materials which mitigate the friction inherent in this type of actuator. Materials such as polytetrafluoroethylene (PTFE) or molybdenum disulfide can be used as a coating for threaded elements, and added to molding resins to optimize the tribology between lead screw and nut of such a driver. This can also reduce power consumption and improve servo response.

Coarse tracking motor 292 moves in response to a signal derived from a position sensor on the fine tracking motor (described below). The fine tracking motor follows the tracks on an optical disc, including disc runout, and accomplishes small seek movements. However, when the fine tracking motor is away from its center position by a specified average amount, lead screw 296 will be turned to advance or retract the optomechanical carriage assembly 282 to a position near the center of the fine tracking motor travel. The two-stage spur gear reduction unit 294 allows the use of a small, low current motor. Other gear reduction schemes could also be used, but spur gears are low cost and high efficiency. The gears in gear reduction unit 294 correspond roughly to 120 diametral pitch gears, but they could also be special pitch or metric module gears. The gear reduction unit may also contain anti-backlash gears.

Figure 17:
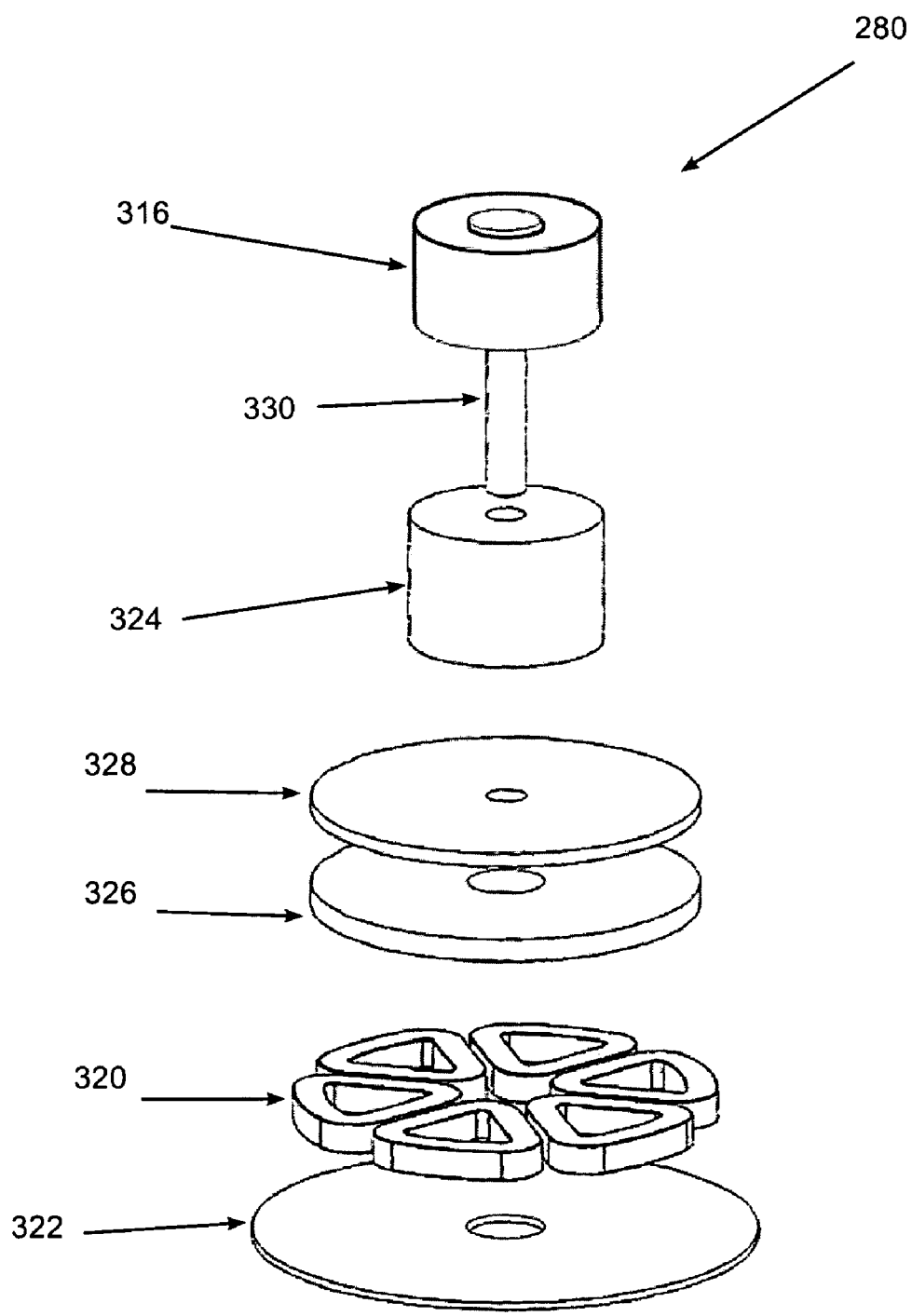
FIG. 17 is an exploded view of the spindle assembly.

FIG. 17 is an exploded view of spindle assembly 280, including a spindle chuck 316, a spindle shaft 330, a spindle rotor magnet 326 and backing plate 328, a spindle bearing/bushing 324, stator coils 320 and a stator plate 322.

Stator coils 320 and stator plate 322 are both glued to PCBA 308 (see FIG. 15). Stator coils 320 are a standard brushless multi-phase drive for spindle rotor magnet 326, which is magnetized in "pie-slice" shaped segments through its thickness in the axial direction. The north-south orientation of the magnetic material is in the same direction. The magnetic material is preferably a barium ferrite ceramic, but it could be any of several others, including a rare-earth composite or hard magnetic material, such as neodymium-iron-boron, samarium cobalt, etc.

Figure 18A:
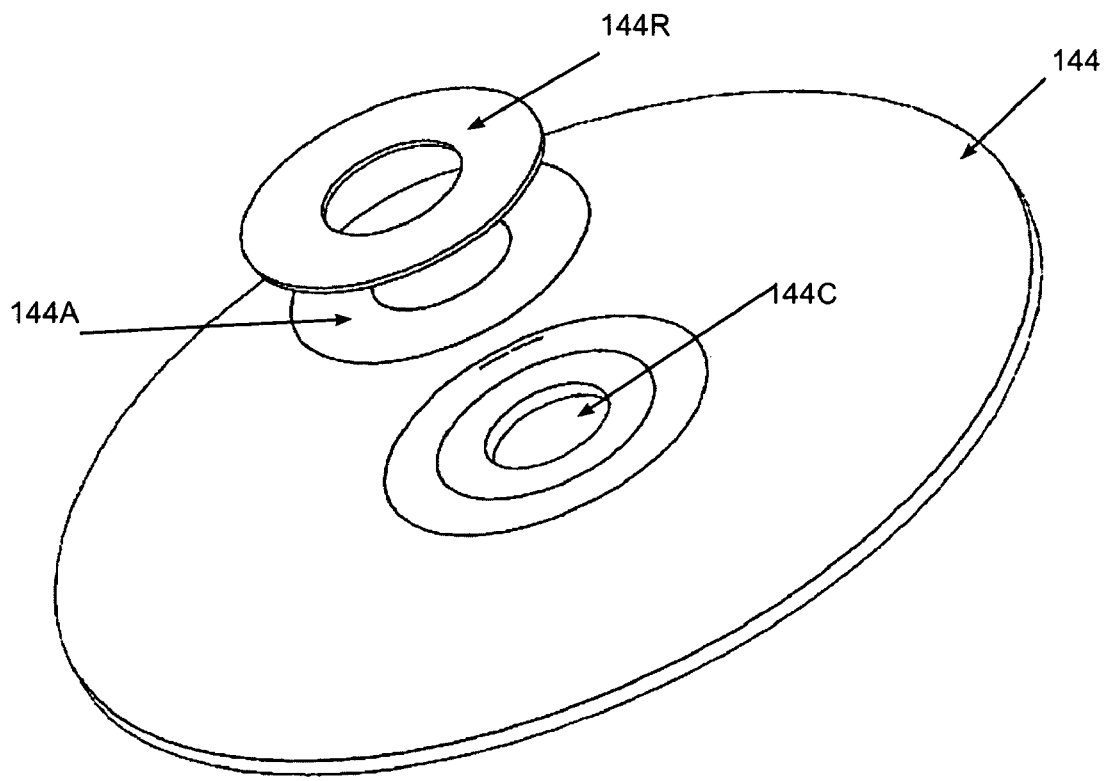
FIG. 18A is an exploded view of the optical disc.

FIG. 18A is an exploded view of disc 144, showing the magnetic retention ring 144R and a pressure-sensitive adhesive ring 144A, which bonds magnetic retention ring 144R to disc 144. Also shown is the central hole 144C of disc 144. Magnetic retention ring 144R is made of a magnetic material, such as plated steel or magnetic stainless steel, and is bonded to the non-data side of disc 144 around central hole 144C. Magnetic retention ring 144R could be 0.2 mm thick and 8-9 mm in diameter, for example.

Figure 18B:
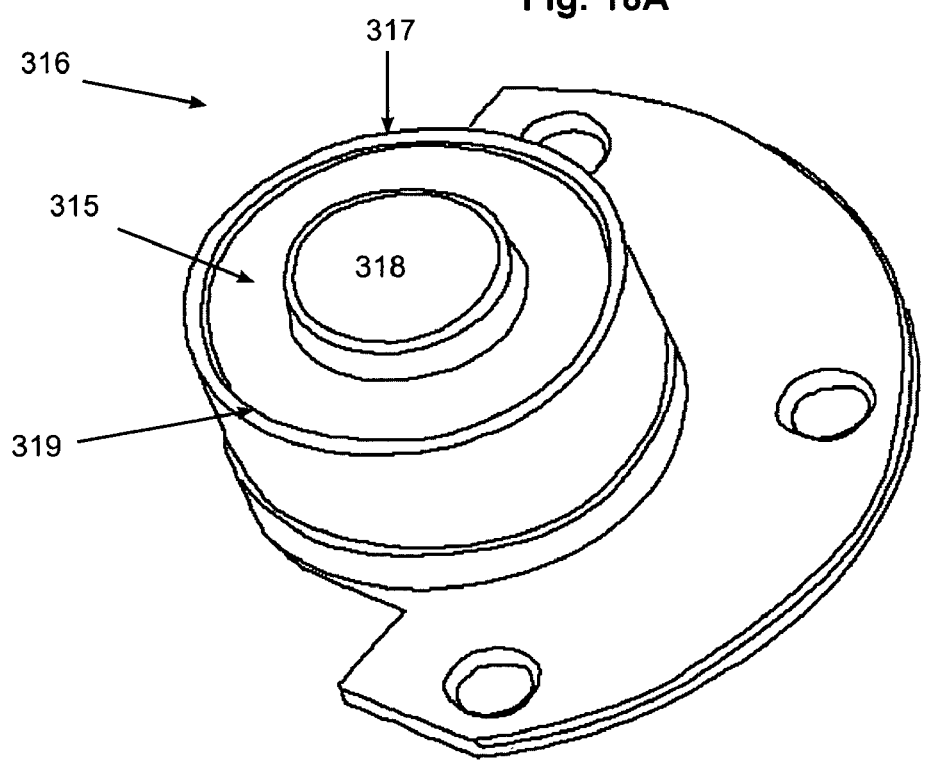
FIG. 18B is a perspective view of the spindle chuck.

FIG. 18B shows the structure of spindle chuck 316. Spindle chuck 316 includes a spindle pin 318, which is surrounded by a magnet 315 and a circular platen 317. Magnet 315 is magnetized with multiple pie-shaped magnets having their poles parallel to the axis of spindle chuck 316. Half of the north poles and half of the south poles are oriented in the same direction. For example, if there are eight magnets, four north poles and four south poles would face in the same direction, with the north and south poles alternating. A greater number of magnets provides a greater retention force when disc 144 is fully mounted on spindle chuck 316, but the magnetic lines of force are more concentrated and the "reach" of the magnetic field is therefore less than with a fewer number of magnets.

Figure 19A:
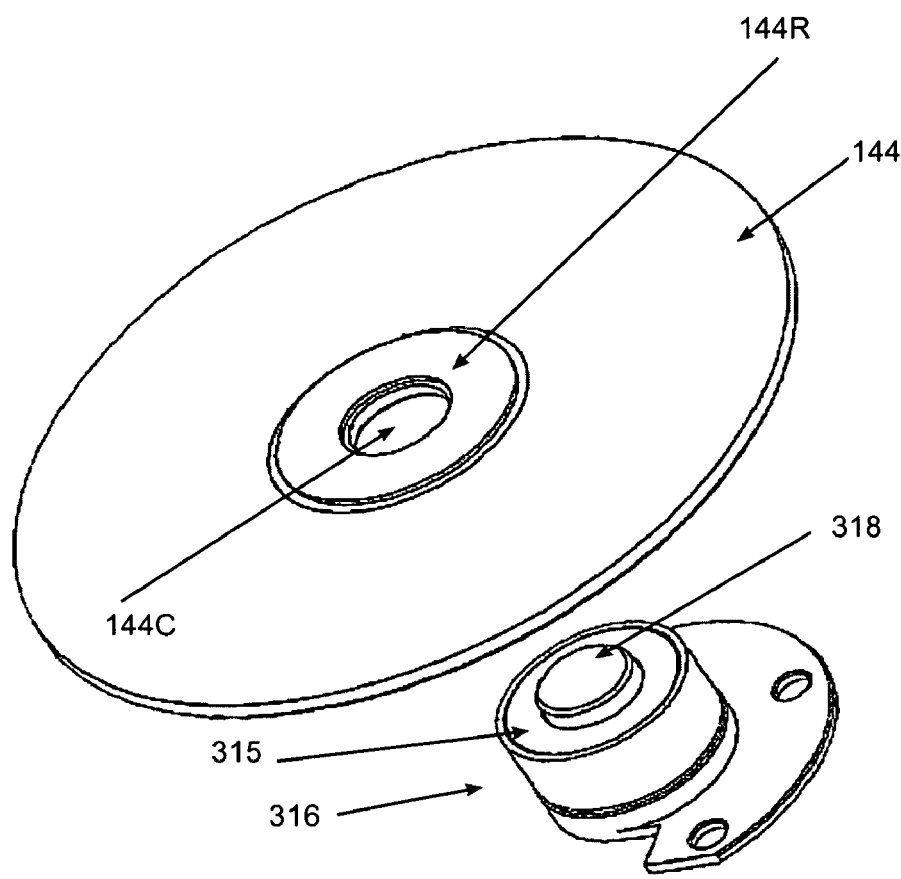
FIGS. 19A and 19B show the optical disc and the spindle chuck separated and in contact, respectively.
Figure 19B:
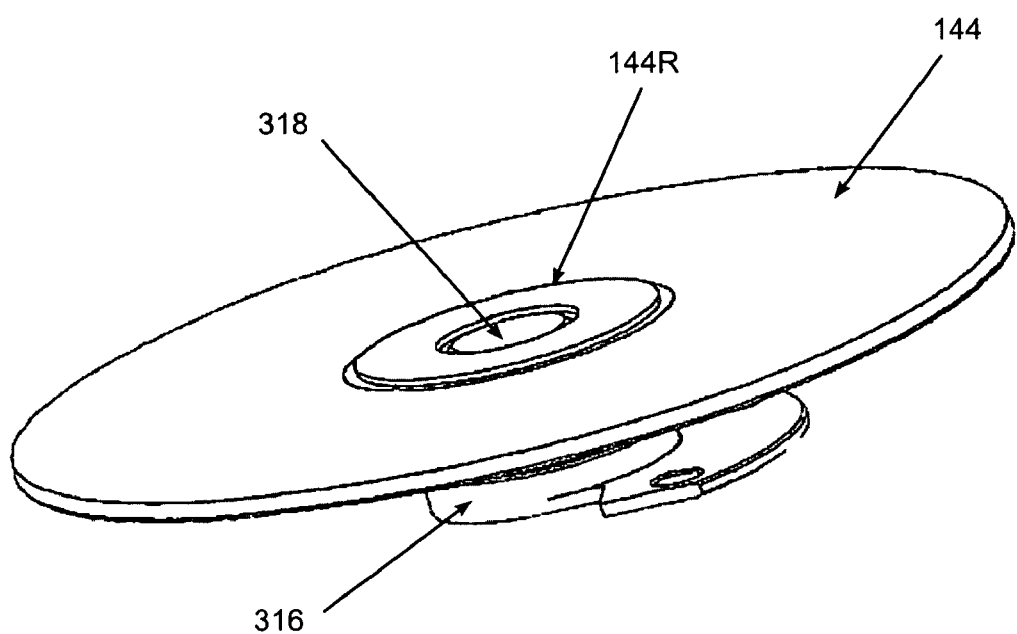

FIGS. 19A and 19B show disc 144 approaching and mounted on spindle chuck 316, respectively. When disc 144 is mounted on spindle chuck 316 (FIG. 19B) spindle pin 318 protrudes into the central hole 144C of disc 144, and the force between magnet 315 and magnetic retention ring 144R (through the thickness of disc 144) presses the data side of disc 144 flat against circular platen 317. Spindle pin 318 is a close fit (e.g., within 0.05 mm) to central hole 144C, so that disc 144 is precisely centered on spindle chuck 316. To allow for some eccentricity of disc 144 as it approaches spindle chuck 316, the nose of spindle pin 318 is formed with a chamfered surface 319, as shown in FIG. 18B.

Thus, referring again to FIG. 13B, as cartridge 10 is lowered onto spindle assembly 280, the lines of force of magnet 315 interact with magnetic retention ring 144R and draw disc 144 onto spindle chuck 316. This action tends to compress adhesive ring 144A. Magnetic retention ring 144R must be centered accurately enough with respect to central hole 144C so as not to interfere with the projection of spindle pin 318 into central hole 144C (typically to a tolerance of 2 mm).

Figure 20:
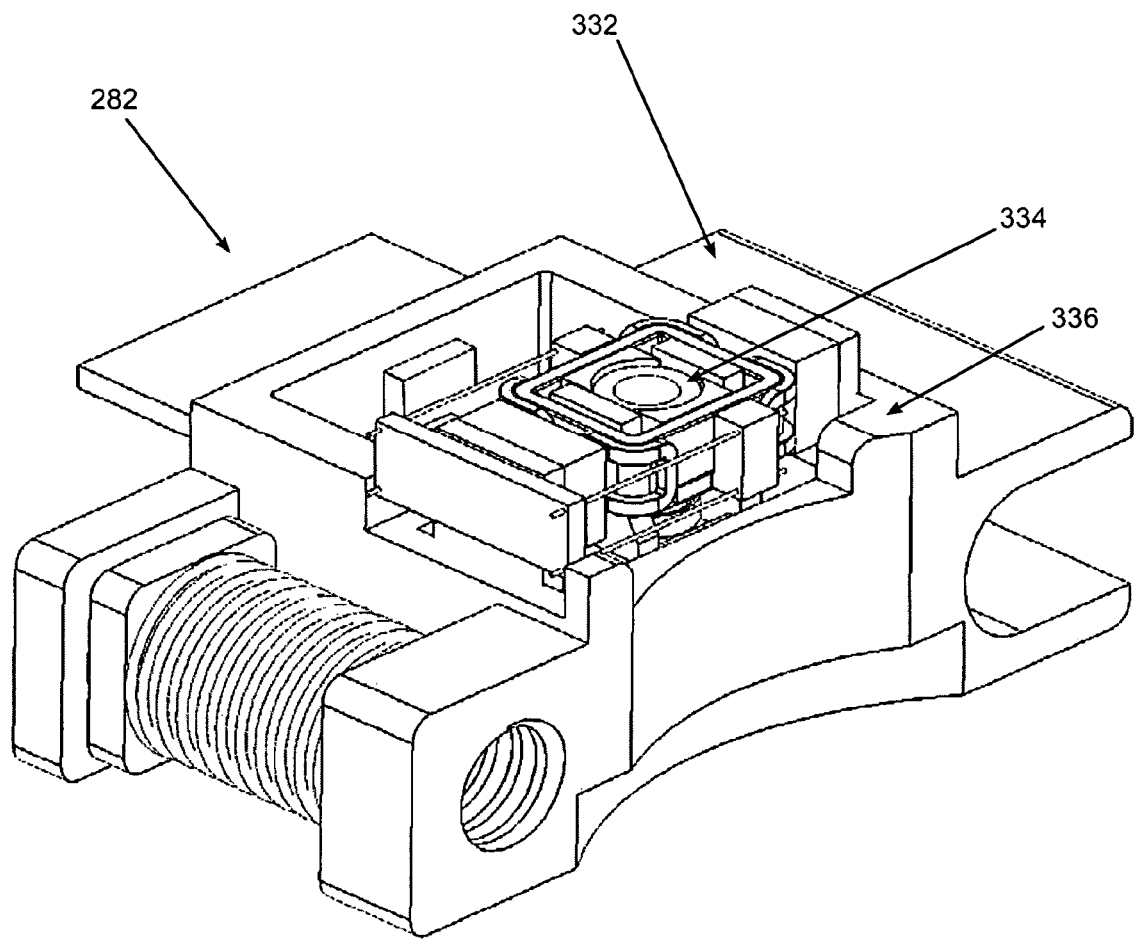
FIG. 20 is a general view of the optomechanical carriage assembly.

FIG. 20 is a general view of optomechanical carriage assembly 282, which includes a carriage body 332, an optics assembly 334, and a fine tracking/focus mechanism 336.

Carriage body 332 is a molded/cast part. Carriage body 332 supports elements of optics assembly 334 and attachments for flexible interconnect 306 and provides the guided surfaces for the motion of carriage assembly 282 along the tracking path. It is coupled via lead screw 296 to coarse tracking motor 292. Carriage body 332 also absorbs heat from the electronics, laser diode, and servo motors. It may be made of materials which reduce friction so that the driving female threaded element that meshes with lead screw 296 can be molded directly into carriage body 332.

Optics assembly 334, which is described in greater detail below, includes a laser diode, servo detectors, beam distribution and splitting prisms, collimation and objective lenses, a wave retardation plate, a reflective position flag, and a reflective power monitoring surface. In addition, some of the detectors may be mounted on substrates which also include signal amplification electronics.

Fine tracking/focus mechanism 336 includes shared magnetic circuits and five coils that together comprise a two-axis voice coil motor used to position the readout objective lens (which is also part of optics assembly 334).

Figure 21:
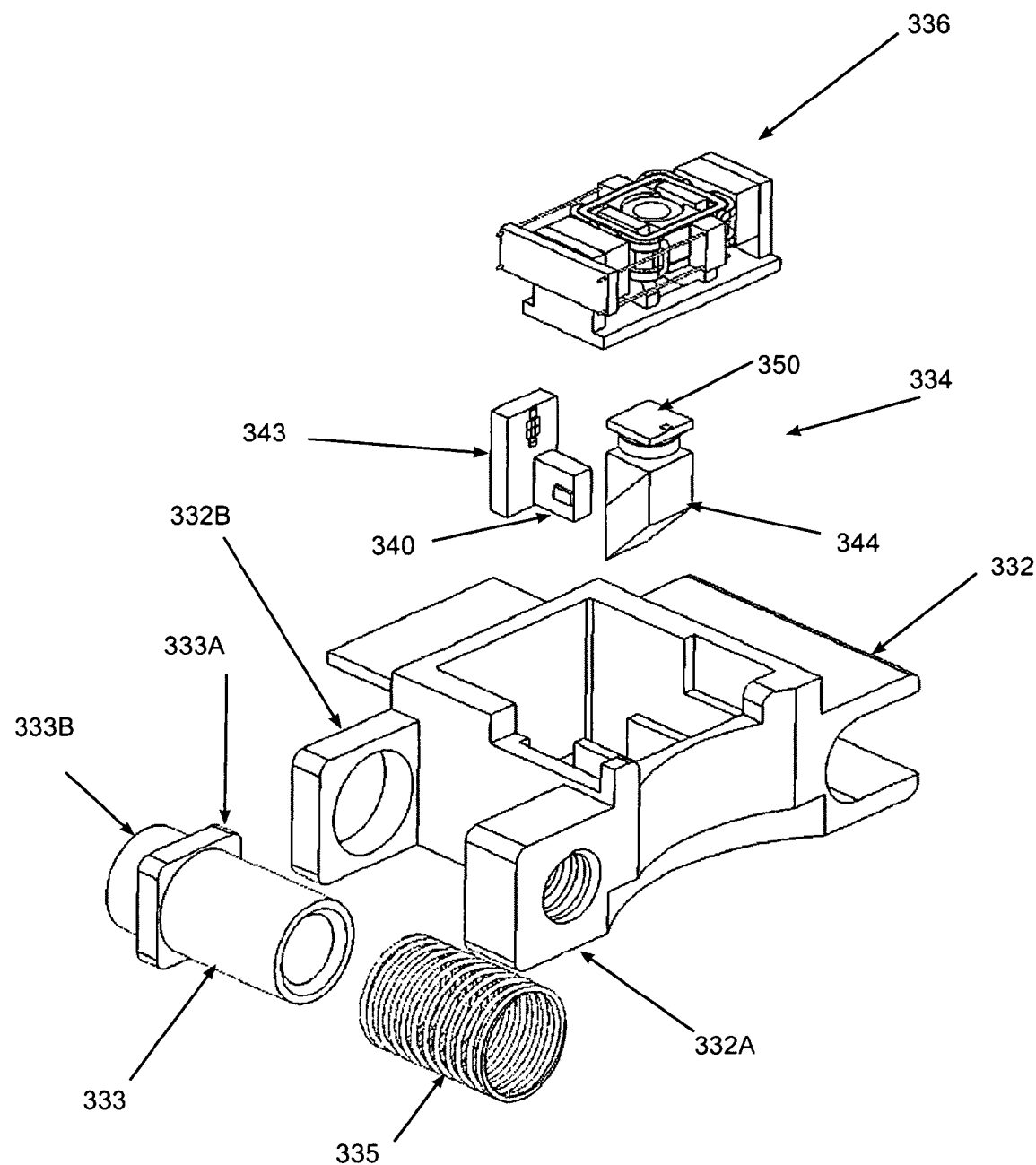
FIGS. 21 and 22 are exploded views of the optomechanical carriage assembly.
Figure 22:
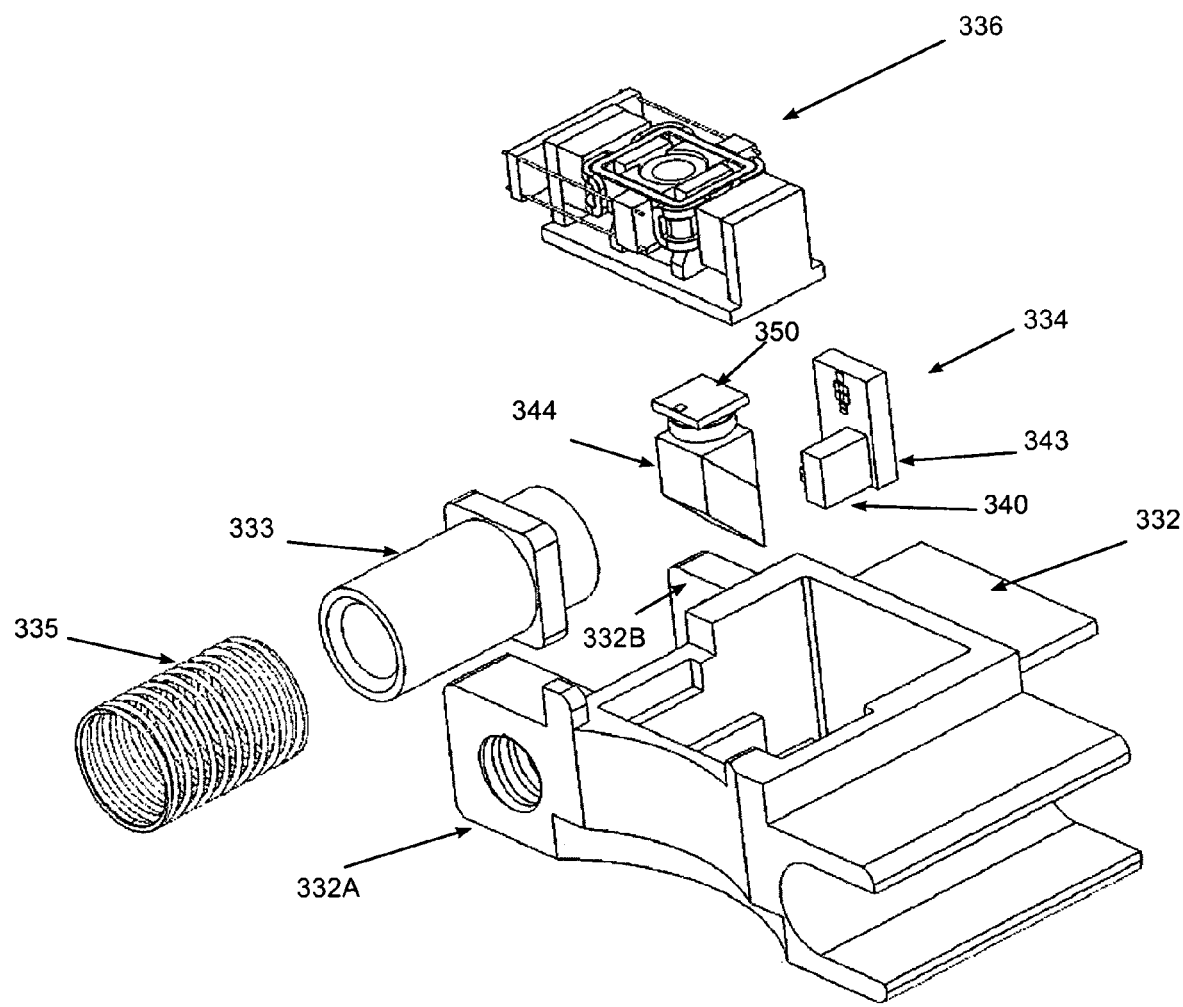

FIGS. 21 and 22 are exploded views of optomechanical carriage assembly 282 taken from different angles. Also shown in FIGS. 21 and 22 are an anti-backlash mechanism that includes a threaded sleeve 333 and a compression spring 335. Carriage body 332 includes a first flange 332A which contains a threaded aperture that, as noted above, meshes with lead screw 296, and a second flange 332B that contains an unthreaded aperture. The central aperture of sleeve 333 likewise threaded to mesh with lead screw 296. Sleeve 333 is installed between flanges 332A and 332B with a round end 333B projecting into the hole of flange 332B and with compression spring 335 enclosing sleeve 333 and butting against flange 332A and a shoulder 333A of sleeve 333. When lead screw 296 is threaded into flange 332A and sleeve 333, compression spring 335 exerts a gentle outward pressure against flange 332A and sleeve 333. This prevents any slack or lost motion between optomechanical carriage assembly 282 and lead screw 296.

Figure 23:
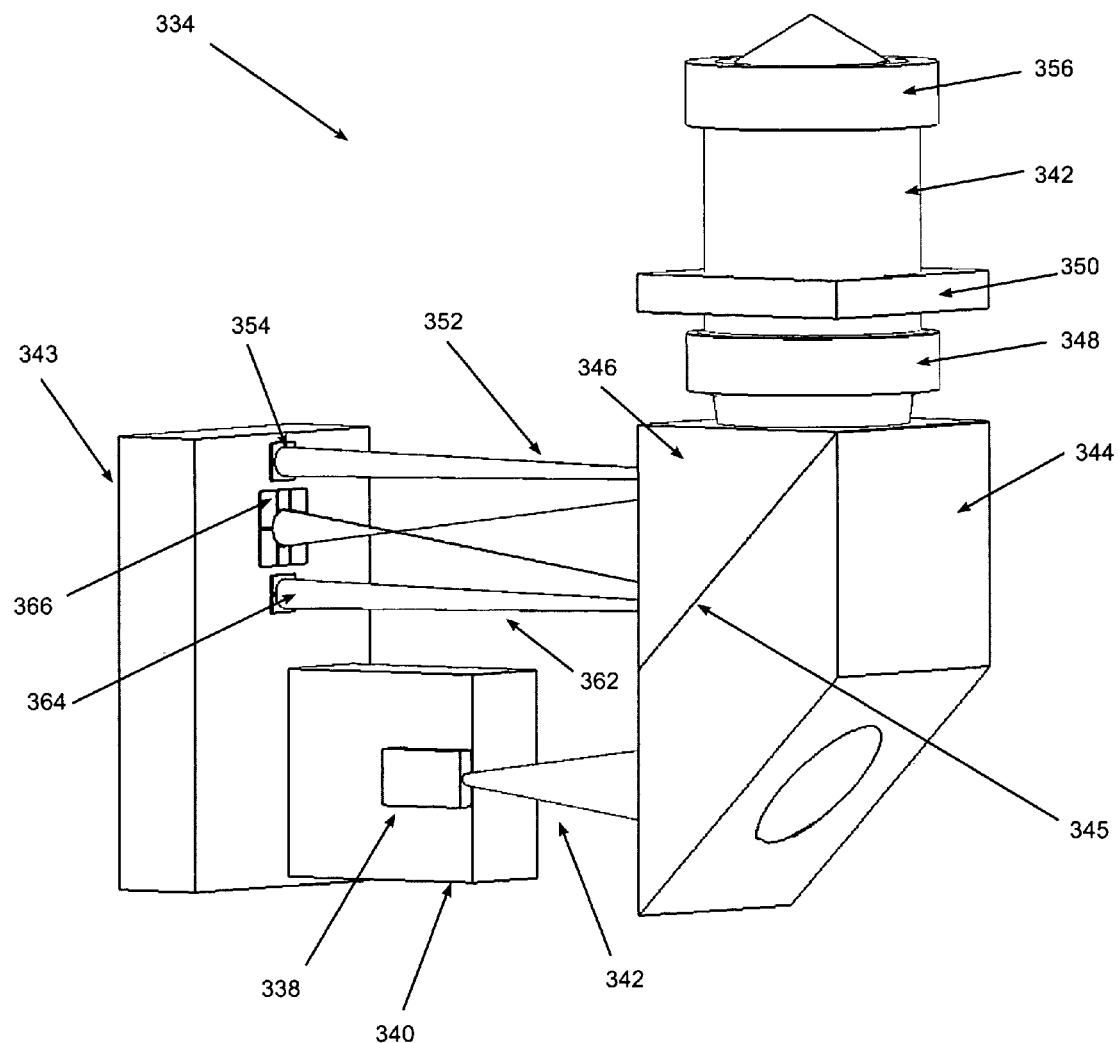
FIG. 23 is a schematic view of the optics assembly.

FIG. 23 illustrates a schematic view of optics assembly 334. For purposes of this description, the terms "up," "down," "above" and "below" are used in relation to FIG. 23.

The laser beam originates in a laser diode 338. Laser diode 338 preferably provides a blue laser beam with a wavelength of 405 nm. Laser diode may be a Cree model 405LD 500 or a Sanyo model LS5000. Use of a 405 nm blue laser beam permits the track pitch on disc 10 to be reduced to 0.37 μm from the pitch of 0.74 μm required for a typical 600-700 nm red laser beam, for example.

Laser diode 338 is mounted on a heat sink 340 near the bottom of a laser diode/detector substrate 343. A laser beam 342 emanates from laser diode 338 as a diverging, elliptical cone of light. Laser beam 342 enters a rhombic prism 344 and is directed upward by internal reflection in prism 344.

Rhombic prism 344 is attached to a half cube 346. A diagonal surface between the rhombic prism 344 and half cube 346 is coated with a polarization sensitive layer, which forms a beam-splitting interface 345. The predominant polarization of laser beam 342 causes it to pass through beam-splitting interface 345 and continue upward. After laser beam 342 leaves half cube 346, it enters a collimating lens 348.

Collimating lens 348 converges laser beam 342 just enough to make the beam a collimated (parallel ray) beam. Above collimating lens 348 is a quarter-wave retardation plate 350, having its optical axis oriented at 45 degrees to the incident polarization of laser beam 342. After the light passes through the quarter-wave plate 350, it is circularly polarized.

Figure 24:
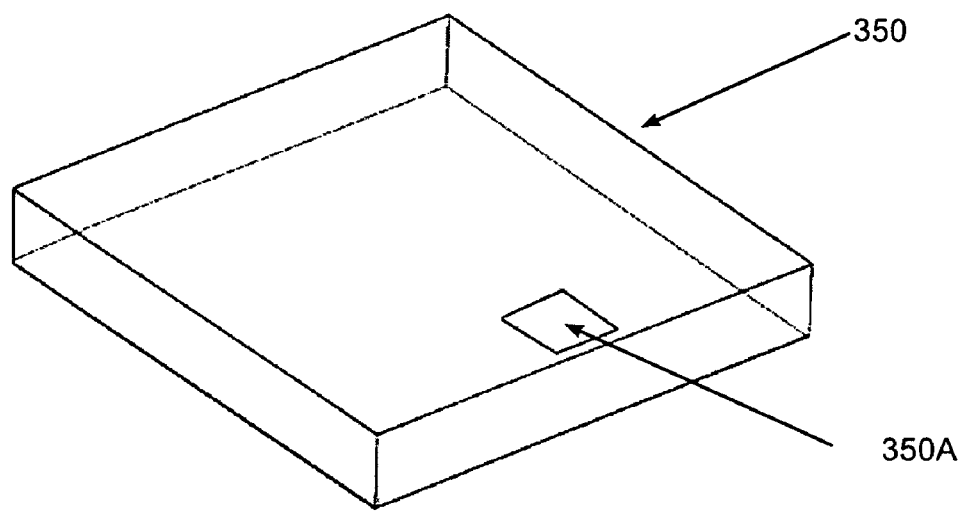
FIG. 24 shows the quarter-wave plate.

On the upper surface of quarter-wave plate 350, shown in FIG. 24, is a small silvered area 350A, which reflects a portion of the upward bound laser beam 342 back through quarter-wave plate 350. That reflected "beamlet" is converted to linear polarization after passing through quarter-wave plate 350, such that its polarization is now rotated 90 degrees from the polarization of laser beam 342 when it left collimating lens 348. When this "beamlet" encounters beam-splitting interface 345, it is now reflected instead of transmitted. This reflected "beamlet", shown at 352 in FIG. 23, is directed to a photodetector 354 on substrate 343, where it is used to modulate the laser power control loop.

Figure 25:
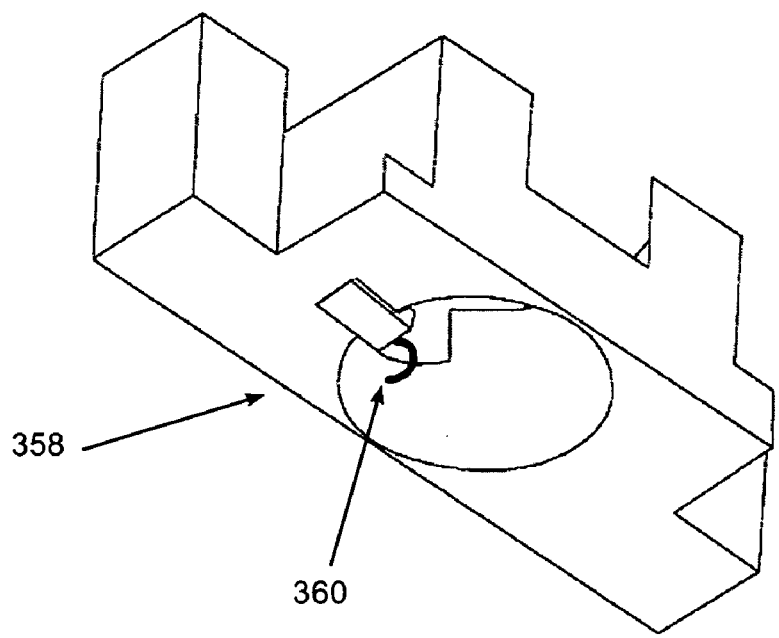
FIG. 25 shows the objective lens mount.

The remainder of the outbound beam (minus the "beamlet") proceeds upward towards an objective readout lens 356, which is supported by an objective lens mount 358, shown in FIG. 25 from below. Protruding from objective lens mount 358 is small, shaped reflective element 360, which returns another portion of laser beam 342. Reflective element 360 may be made of metal, and may be added to lens mount 358, or it may comprise a reflective coating applied to a molded plastic feature. Its reflective surface may be planar or curved.

The portion of laser beam 342 that is reflected from reflective element 360 is reflected in a direction that is determined by the position of lens mount 358 along the "tracking axis." The "tracking axis" of lens mount 358, described further below, nominally coincides with the axis along which laser beam 342 is reflected upward by the rhombic prism 344. This second "beamlet" 362 returns in the same way as the first "beamlet" 352, making a second pass through quarter-wave plate 350, but on the opposite side of the main laser beam 342. The polarization of second "beamlet" 362 is likewise rotated another 90 degrees and is therefore reflected by beam splitting interface 345 towards substrate 343 where it illuminates a split position-sensitive photodetector 364. Photodetector 364 is split horizontally, and the power of "beamlet" 362 is distributed vertically between the two halves of split photodetector 364 in proportion to tracking axis of objective lens mount 358. The position of the spot formed by "beamlet" 362 on split photodetector 364 thus provides an indication of the position of the fine servo motor (described below) that controls the orientation of the tracking axis of lens mount 358.

Figure 26:
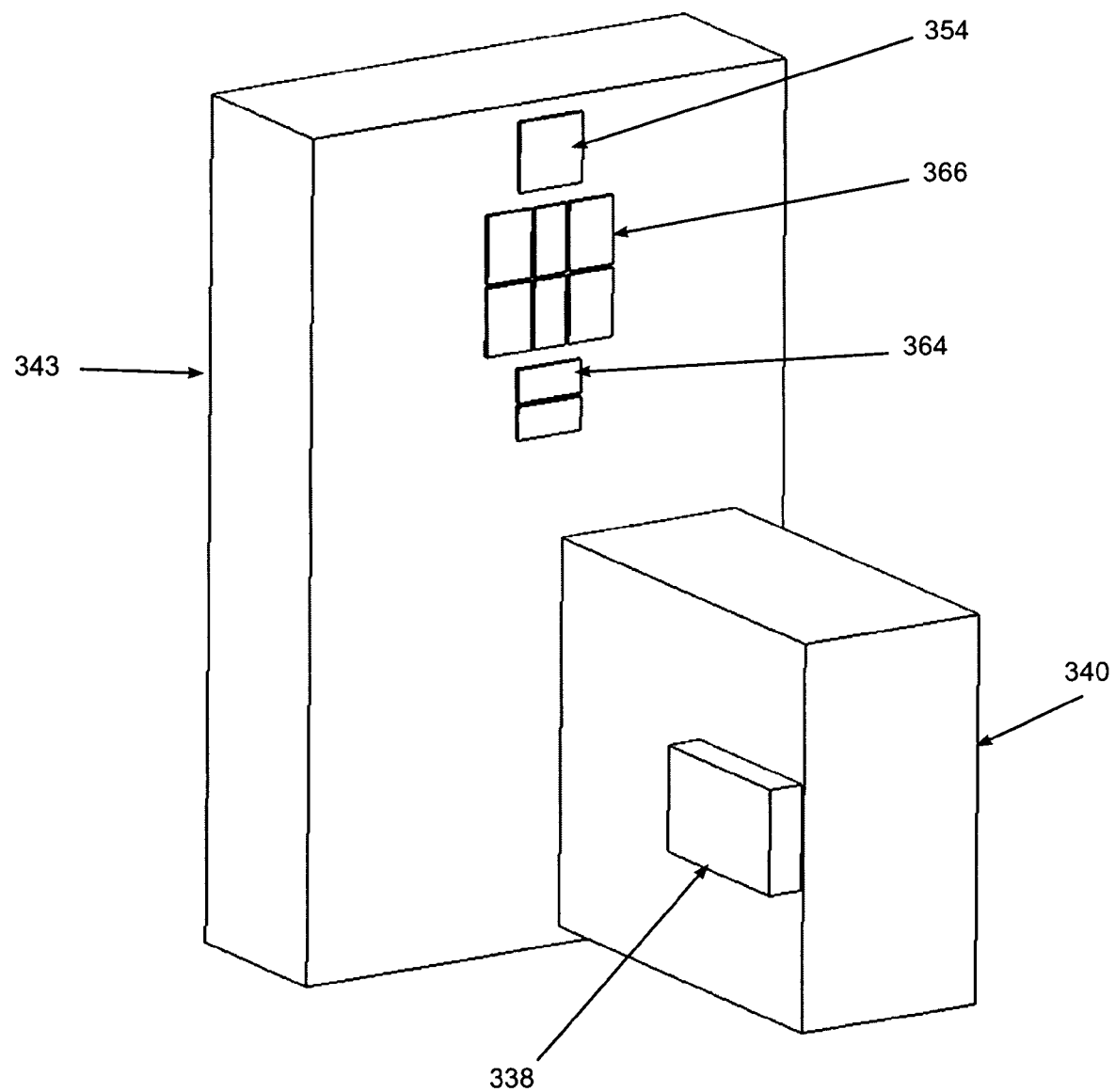
FIG. 26 shows the respective positions of the laser diode and tracking photodetector on the laser diode/detector substrate.

FIG. 26 shows the respective positions of photodetector 354 and photodetector 364 on substrate 343.

Referring again to FIG. 23, the rest of laser beam 342 proceeds upward through the readout objective lens 356 and is focused on the data tracks on optical disc 116 (not shown). Laser beam 342 is reflected by the disc and passes back through objective lens 356, quarter-wave plate 350 and collimating lens 348. Laser beam 342 is then reflected at beam splitting interface 345 towards laser diode/detector substrate 343, where it is incident on a servo photodetector 366. As shown in FIG. 26, servo photodetector 366 has six segments (photodiodes). The segmented structure of servo photodetector 366 allows a determination of the beam distribution and intensity as it returns from the disc and is reflected at beam splitting interface 345.

The numerical aperture of lens 356 is high (e.g., approximately 0.73) and therefore, when the collimated beam 342 is focused on a reflective surface, a "cateye" reflector is formed. As a result, when laser beam 342 is focused exactly on the disc, the reflected beam will effectively retrace its path and re-form as a collimated beam after passing back through objective lens 356. If the position of objective lens 356 is above or below the position that creates an exact focus on the disc, the return beam below objective lens 356 will converge or diverge, i.e., when lens 356 is too close to the disc, the return beam will be slightly convergent, and when lens 356 is too far from the disc, the return beam will be slightly divergent. The variation of the convergence or divergence with focus error is proportional over a small range of focus error, and creates differences in the outputs of the segments of servo photodetector 366. The focus error is determined by taking the sums and differences of the segments of servo photodetector 366 in horizontal and diagonal groups.

The preformatted data tracks on the disc cause the return beam to be diffracted in both the cross track (track) and along track (data) directions. When the beam is centered on a track, the pattern of the return beam projected onto the servo photodetector 366 is essentially three superimposed spots: one bright central (or zero-order) spot, and two fainter, first-order diffracted spots, one above and one below the central spot and symmetrically overlapping the central spot. When the focused outbound beam moves slightly off-track, the projected intensity pattern of the reflected beam shifts becomes asymmetric. This asymmetry produces differential intensity changes along the vertical axis of servo photodetector 366. Tracking error signals are obtained by observing the difference between the sum of the outputs of the upper segments and the sum of the outputs of the lower segments.

Alternatively, a differential phase detection method can be used to generate a track error signal, as is commonly done in DVD players.

The intensity changes caused by the imprinted data pits are detected by monitoring the sum of the outputs of all segments of servo photodetector 366.

Algorithms for controlling the tracking and focus of the laser beam are well known and available from many sources. One tracking and focus system is described in Kadlec et al., U.S. Patent Application Publication No. US 2002/0110056, entitled "Digital Focus And Tracking Servo System," filed Sep. 10, 2001, and references cited therein, all of the foregoing being incorporated herein by reference in their entirety.

Figure 27:
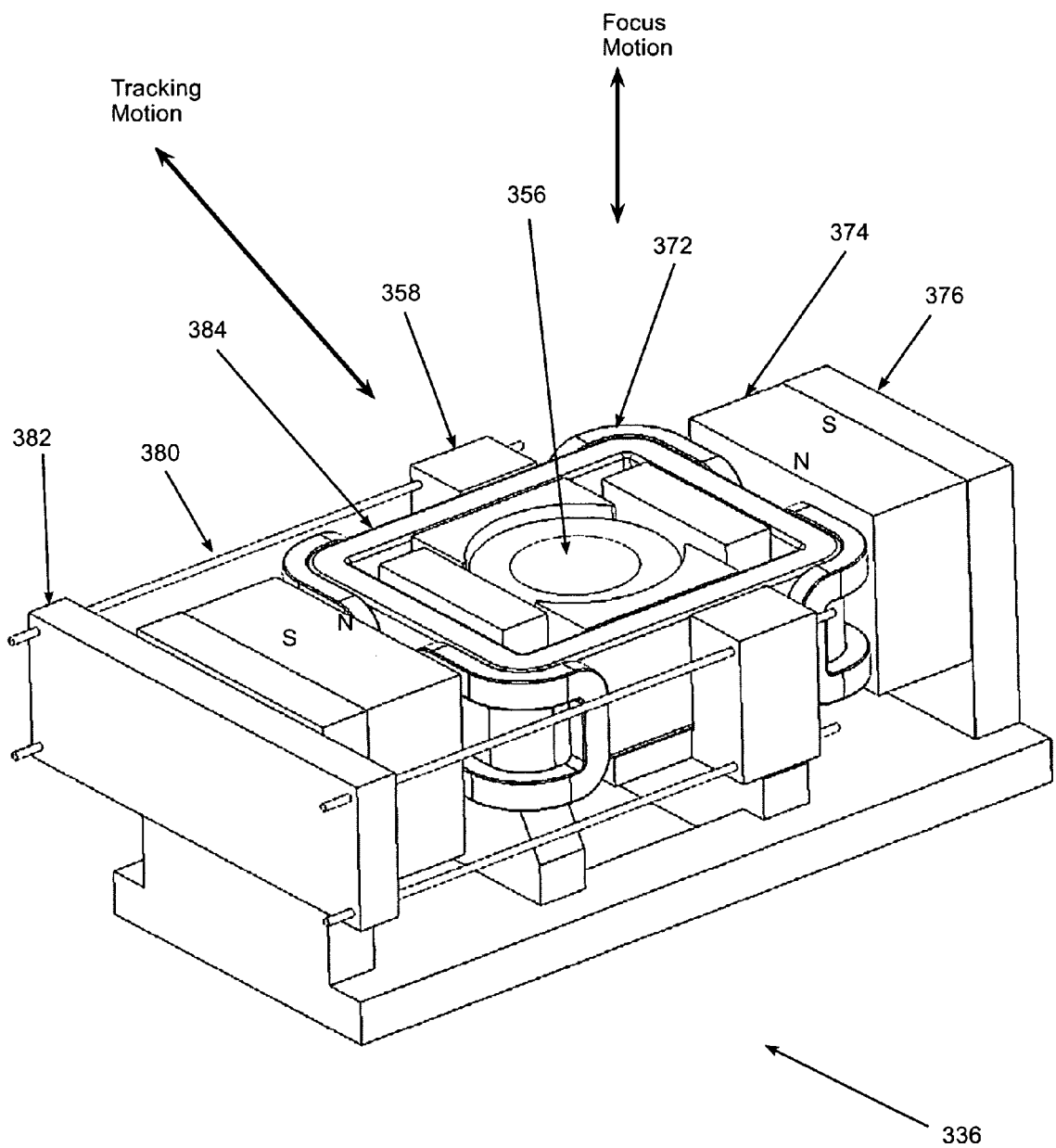
FIG. 27 is a view of the fine tracking/focus mechanism.
Figure 28:
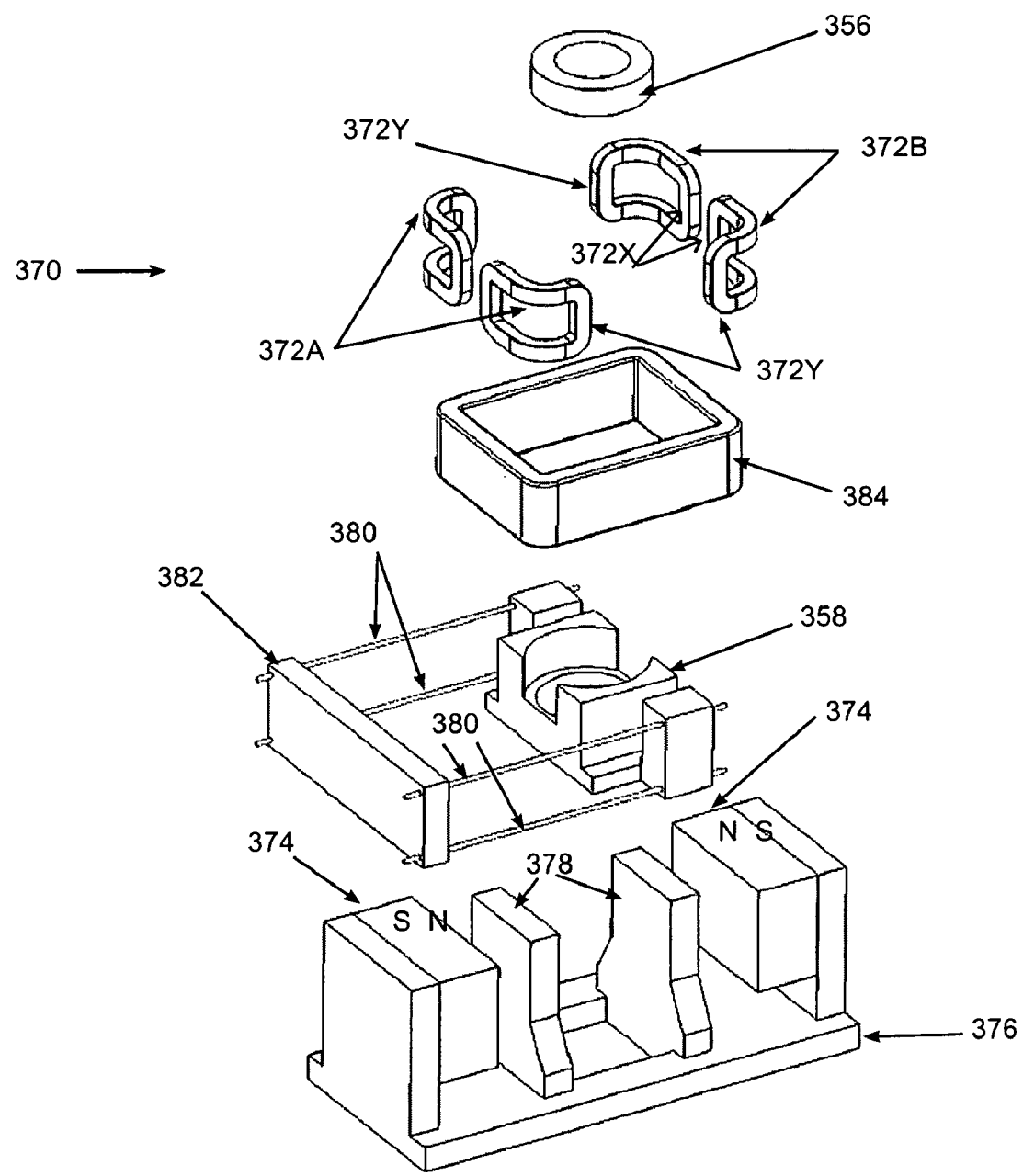
FIG. 28 an exploded view of the fine tracking/focus mechanism.

Fine tracking/focus mechanism 336 includes a fine servo motor 370. In response to control signals, fine servo motor 370 adjusts the position of objective readout lens 356 so as to maintain the laser beam in focus and follow the tracks on the disc. FIG. 27 is a view of fine tracking/focus mechanism 336, and FIG. 28 is an exploded view of fine tracking/focus mechanism 336 showing the components of fine servo motor 370. Objective readout lens 356, shown at the center of fine tracking/focus mechanism 336, is a component of both optics assembly 334 and fine servo motor 370. As shown, objective lens mount 358 fits in a slot formed between walls 378 in a pole assembly 376.

The tracking motion of objective lens 356 is created by moving objective lens mount 358 in the direction of the "tracking motion" arrows in FIG. 27. This motion is created with four "bent" tracking coils 372, subdivided into two groups 372A and 372B. Fine servo motor 370 contains two permanent magnets 374 which are affixed to pole assembly 376 with like poles facing the center of pole assembly 376. (In FIGS. 27 and 28 the north poles are shown facing inward.) This forms two magnetic gaps, one on each side of the center of pole assembly 376, with magnetic flux vectors directed symmetrically inward or outward. The four tracking coils 372 are positioned such that one vertical arm 372X of each coil is located in the one of the magnetic gaps. (Conversely, the remaining vertical arms 372Y, shown in FIG. 28, are outside the magnetic gaps between magnets 374.) Coils 372 are connected in series in such a manner that the currents in the vertical arms 372X of coils 372A flow in the opposite direction to the currents in the vertical arms 372X of coils 372B, i.e., when current flows downward in the vertical arms 372X of coils 372A, the current flows upward in the vertical arms 372X of coils 372B, and vice-versa. Depending on the direction of the currents, coils 372 and the remainder of fine servo motor 370 (including lens 356) will be subjected to an electromotive force in one of the directions of the "tracking motion" arrows.

Objective lens mount 358 is attached to four flexure wires 380, the other ends of which are attached to a mounting plate 382. Flexure wires 380 allow lens mount 358 and lens 356 to move in the direction of the "tracking motion" and "focus motion" arrows shown in FIG. 28 but prevent it from moving in an direction orthogonal to the tracking and focus motions.

Two of flexure wires 380 also provide the electrical connections for tracking coils 372. Both mounting plate 382 and objective lens mount 358 are made of an insulating material such as a plastic resin having a Young's modulus of $2.8 \times 10^4$ MPa ($4.4 \times 10^6$ psi) or higher. Thus, flexure wires 380 are insulated from the rest of the assembly by the mounting plate 382 and objective lens mount 385.

Flexure wires 380 can be made of beryllium copper or some other high yield-strength material to minimize damage in operation or assembly. Flexure wires 380 should have a low electrical resistance to minimize any damage from heating. They are preferably corrosion resistant and could be coated or sleeved for vibration damping, e.g., with a thin elastomer film or molded part.

Using flexure wires 380 to carry current to tracking coils 372 allows the movement of lens 356 to approximate a smooth, orthogonal movement in tracking and focus directions. Using other wires to make the electrical connections may introduce moments which disturb this motion in an uncontrollable way.

The vertical motion necessary to focus lens 356 is provided by a rectangular coil 384, which is enclosed within the four tracking coils 372 when fine servo motor 370 is assembled (FIG. 28). Coil 384 is positioned in the magnetic gaps between permanent magnets 374, and provides summed Lorentz forces which move coil 384 up or down when current flows through it. For the reasons described above, coil 384 is preferably supplied with current through the two flexure wires 380 that are not used to supply current to tracking coils 372.

To minimize any tilting of lens 356 it is desirable that the net electromotive force vectors provided by coils 372 and 384 in the tracking and focus directions, respectively, pass through the central of gravity of fine servo motor 370 (including lens 356) and objective lens mount 358.

It will be understood that optics assembly 334 is only one embodiment of an optics assembly that could be used in a disc drive of this invention. Although optics assembly 334 is compact in design and low in power, it should be apparent that a number of alternative head designs meeting these two criteria are possible and therefore suitable for application in a disc drive of this invention. Current DVD-type pickup designs may be too large because they must support two laser wavelengths which allow them to read both DVD and CD type media. However, designing a 405 nm only optical pickup with either single or three-beam tracking is within the ability of those skilled in the art. Such designs would utilize CD-like optical configurations such as those described in U.S. Pat. No. 5,033,042 (three-beam) or U.S. Pat. No. 5,694,385 (single beam), each of which is incorporated herein by reference in its entirety, modified with optics suitable for 405 nm and the higher 0.73 NA lens described herein. Such pickup modules would include a laser, polarizing beam splitter, collimator, λ/4 waveplate, objective lens, forward photodetector, and, servo/data quad detector as indicated in the above referenced patents. These components perform the same functions as are described herein, with the combination of the polarizing beam splitter and λ/4 waveplate serving to separate the light reflected from the disc and redirect it to the servo/data quad detector. The polarizing beam splitter also separates a small amount of the light incident from the laser and redirects it to the forward photodetector for monitoring the laser power. This type of optical path is typical in CD players and can also be made compact and low power.

Optical Drive Electronics

IC chips mounted on optical drive PCBA 132, shown in FIG. 7, represent the optical drive electronics that controls the optical drive module 122.

Figure 29A:
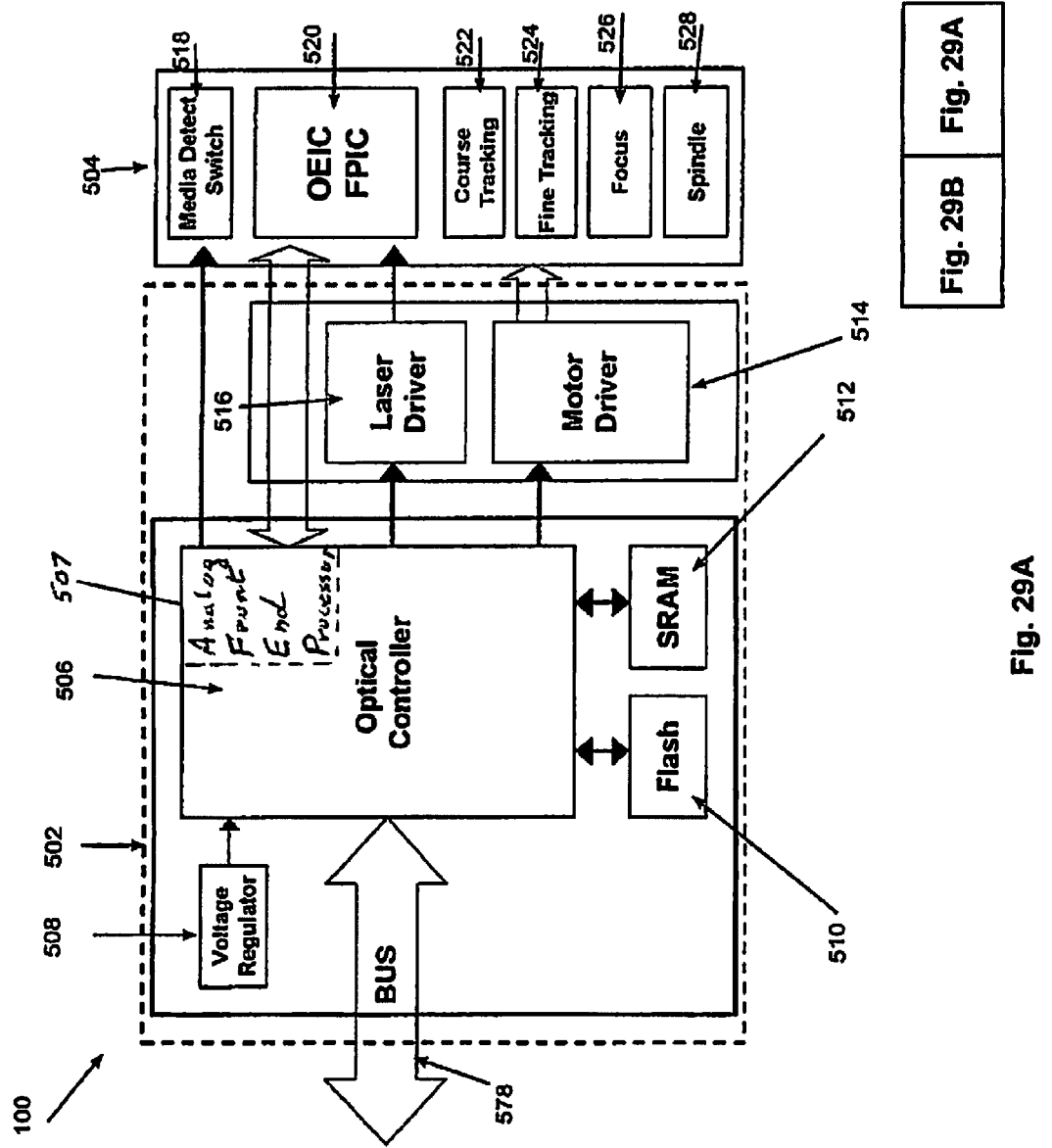
FIG. 29A is a block diagram of the optical drive electronics.

A block diagram of optical drive electronics 100 is shown in FIG. 29A. Optical drive electronics 100 contains two basic components: an optical controller section 502 and a pick-up module 504. The state of the art in these controllers is very advanced and highly integrated, so a minimal number of IC chips are necessary. The main element of optical controller section 502 is an optical controller IC 506, which can be realized as either a single or dual IC. In dual IC designs, the controller function is realized using a digital controller IC and an analog front end processor. In single IC designs these two functions are combined, as shown in FIG. 29A, wherein the optical controller IC 506 includes an analog front end processor 507.

Table 1 lists several commercially available ICs that could be used in the dual IC configuration of optical controller IC 506.

TABLE 1

| Digital Controller IC | Analog Front End Processor |
|---|---|
| M5705 DVD-ROM Controller IC | SP3721D Analog Front-End IC |
| AMT 2002 DVD Digital Servo | AMT 2001 DVD AFE IC |

The STA1010 optical controller IC from ST Microelectronics could be used n a single-IC design of optical controller IC 506.

The optical controller section 502 also contains a voltage regulator 508, a flash memory 510 and a static random-access memory (SRAM) 512, a motor driver IC 514 and a laser driver IC 516. Motor driver IC 514 and laser driver IC 516 receive control signals from the optical controller IC 506. The STA1015 available from ST Microelectronics could be used for motor driver IC 514.

The other major component of optical drive electronics 100 is pick-up module 504. Pick-up module 504 includes a media detect switch 518, an opto-electric IC (OEIC) and forward photodiode IC (FPIC) 520, and control circuitry for coarse tracking 522, fine tracking 524, and focus 526 and the spindle motor 528.

The digital controller IC within optical controller IC 506 includes the servo digital signal processor (DSP) required to implement the servo/seek functions of the drive, the microprocessor required to control the drive and interface, the analog-to-digital (A/D) and digital-to-analog (D/A) converters required to interface to the optical pick-up module 504, the read-back channel, the encoder-decoder (EnDec), the error correction circuitry (ECC), the media detect switch, and the physical format circuitry.

The interface to the optical controller IC is typically an ATAPI/IDE interface, although other interface standards may also be used.

The digital controller IC within optical controller IC 506 is specific for the physical format of the media being processed. The preferred format of the disc is described in the above-referenced application Ser. No. 10/383,193. This format allows current DVD video and DVD-ROM digital controller ICs to be used in disc drive 5.

The front-end processor within optical controller IC 506 includes the analog circuitry required to interface the electronics within the pick-up module 504, such as the OEIC/FPIC 520, with the digital controller IC. The front-end processor also contains the analog electronics required to control motor driver IC 514 and laser driver IC 516 in addition to analog equalizers for the data channel.

Flash memory 510 contains the operating software (firmware) for the microprocessor within optical controller IC 506 and SRAM memory buffers the data being read from a disc. In the preferred embodiment, at least 8 Mbyte of SRAM is desired to ensure a smooth, uninterrupted video playback in the presence of the external shock and vibration characteristic of a portable video player environment. In order to obtain DVD-quality video using a current state-of-the-art compression technology such as MPEG-4, the average data rate for the audio/video data stream from the disc drive should be at least 1.0 Mbit/sec. In this case, 8 Mbyte of SRAM would allow for about 64 seconds of buffered video playback. Future advances in encryption technology may allow for smaller buffer sizes.

Motor driver 514 is required to drive the carriage drive (coarse tracking) motor 292, the fine servo motor 370, and the motor in spindle assembly 280.

As described above, the optical drive module 122 contains short wavelength (405 nm) laser diode 338, which requires a suitable drive electronics. The 405 nm laser diode requires a higher operating voltage than the more common red (680 nm) lasers used in DVD players and the infrared (780 nm and 830 nm) lasers used in CD players.

Figure 30:
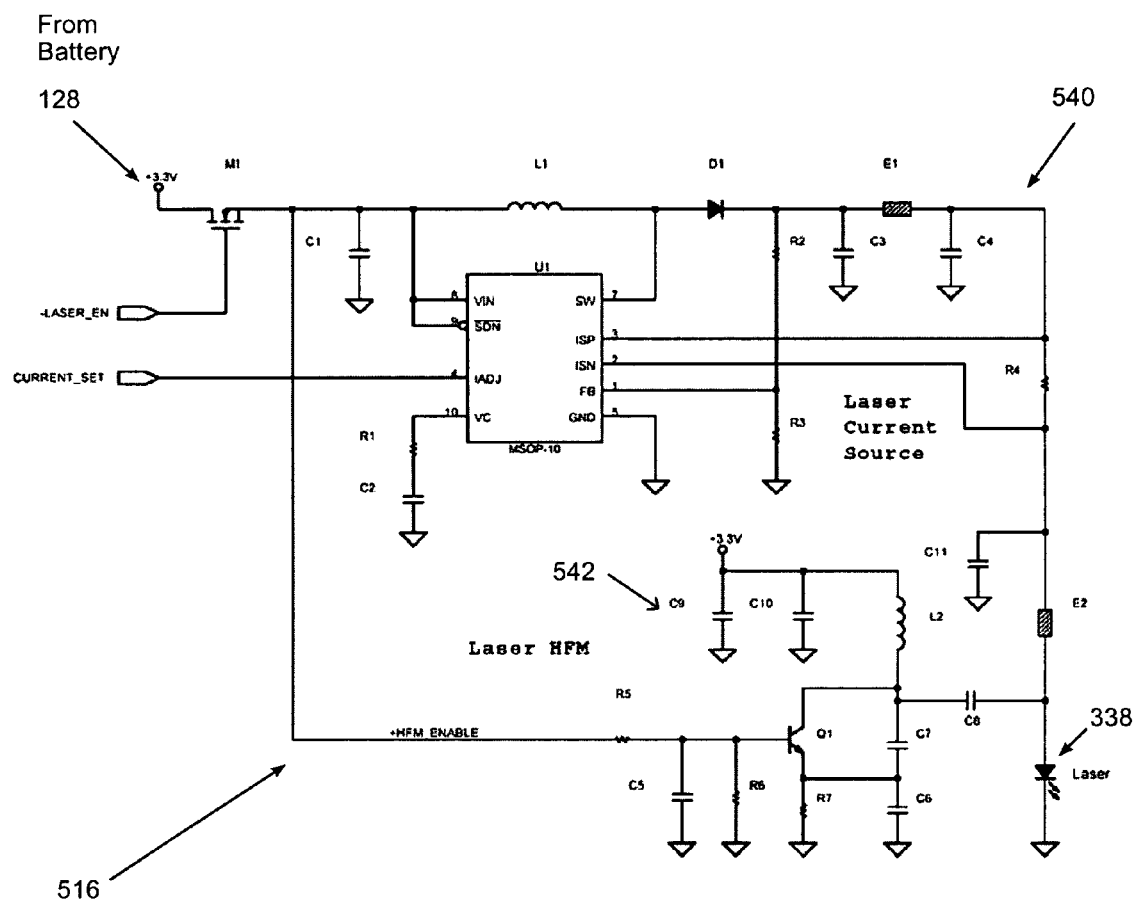
FIG. 30 is a circuit diagram of the laser driver.

FIG. 30 is a diagram of a circuit that may be used for laser driver 516. Laser driver 516 includes a voltage converter/regulator 540 which steps up the 3.3 V supply available from battery 128 to the 6.5 V maximum required by laser diode 338. Resistor R4 is used as a sense/feedback resistor. In addition, a high-frequency RF modulator (HFM) 542 is provided to reduce the laser noise and improve the read back performance.

The outputs from voltage converter/regulator 540 and HFM 542 are combined to produce both DC and AC currents in laser diode 338. Voltage converter/regulator 540 acts as a DC current source. HFM 542 acts as an AC current source. The AC current is coupled to laser diode 338 via capacitor C8 and serves to reduce mode partition noise in laser diode 338. The DC current is supplied to laser diode 338 via blocking ferrite E2 and serves to provide the DC laser threshold current and the DC component of the read current. Blocking ferrite E2 also prevents the AC current from HFM 542 from entering voltage converter/regulator 540. Typically the AC current is adjusted so that the optical power from laser diode 338 is increased by 2-5× from that observed with only the DC current. The exact power factor depends on the specifics of the optical system and laser being used.

HFM 542 is a standard RF oscillator based around biased transistor Q1 and is set to oscillate at a frequency of 400-600 MHz. It is designed to provide 30 mA into a 50 Ohm load. This circuit is typically integrated into a module that is mounted directly onto laser diode 338 to minimize losses and radiation of RF energy. Voltage converter/regulator 540 (the DC current source) includes a standard DC-DC converter (chip U1, inductance L1, diode D1) which uses resistor R4 in a feedback loop to stabilize the current. The signal at the output of diode D1 is filtered by ferrite E1, resistor R2 and capacitors C3 and C4 to remove the converter switching noise. Since a 405 nm blue laser requires a maximum compliance voltage of 6.5V, a DC-DC converter is used to upshift the 3.3V supply voltage. The circuit shown takes an input control signal (CURRENT_SET) of 0-1.6V and outputs a corresponding DC output laser current of 90-0 mA.

FET switch MI acts to disable both voltage converter/regulator 540 and HFM 542 by removing the input 3.3V DC supply voltage. LASER_EN is a control signal that is used to turn FET switch M1 on and off.

Table 2 contains a list of illustrative values of the components of the circuit for laser drive 516 shown in FIG. 30.

TABLE 2

| Component | Value |
|---|---|
| R1 | 2.00 kΩ |
| R2 | 402 kΩ |
| R3 | 100 kΩ |
| R4 | 0.56 Ω |
| R5 | 806 Ω |
| R6 | 1.21 kΩ |
| R7 | 80.6 Ω |
| C1 | 1.0 μF |
| C2 | 10 nF |
| C3 | 4.7 μF |
| C4 | 1.0 μF |
| C5 | 120 pF |
| C6 | 56 pF |
| C7 | 15 pF |
| C8 | 15 pF |
| C9 | 82 pF |
| C10 | 120 Pf |
| C11 | 120 Pf |
| L1 | 2.2 μh |
| L2 | 8.2 Nh |

Table 3 lists by model number the other components that may be used in the circuit of FIG. 30.

TABLE 3

| Component | Model No. |
|---|---|
| M1 | IRLML6401 |
| Q1 | NE68819 |
| E1 | BLM15AG601 |
| E2 | BLM15AG601 |
| D1 | MA2ZD18 |
| U1 | LT1618EMS |

WiFi Transceiver Electronics

Figure 29B:
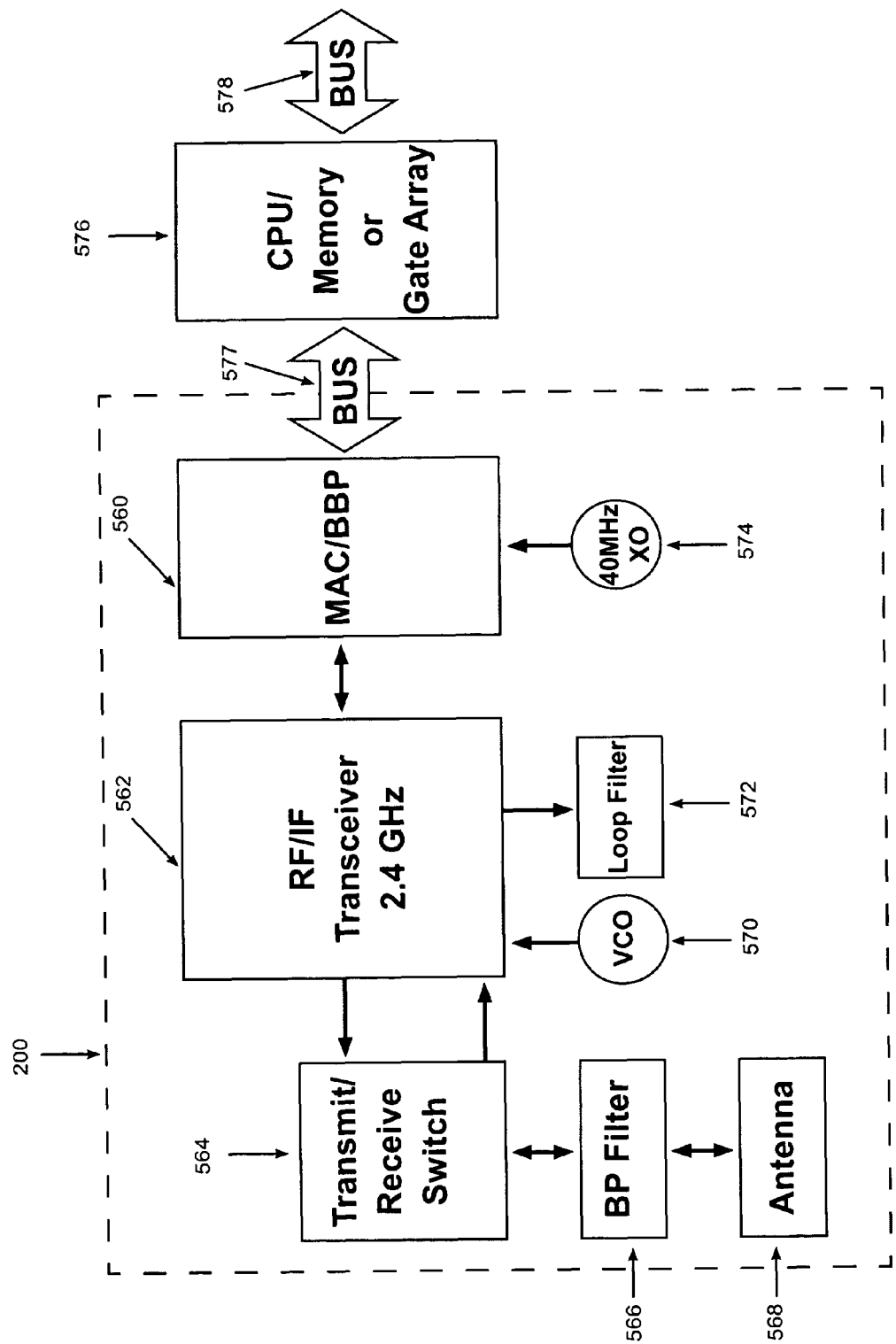
FIG. 29B is a block diagram of the WiFi transceiver unit and the CPU/memory or gate array.

Referring to the block diagram of FIG. 29B, IC chips representing a WiFi transceiver unit 200 are mounted on WiFi PCBA 118. Highly integrated circuits are available to fabricate WiFi transceiver unit 200, so a minimal number of integrated circuits are required. A key component of the control electronics for WiFi transceiver unit 200 is a media access controller (MAC) and base-band processor (BBP) IC 560 (sometimes referred to as the "MAC chip").

MAC chip 560 is driven by a 40 MHz crystal oscillator 574 and includes a microprocessor and circuitry to implement the 802.11 radio interface. The internal microprocessor implements the 802.11 protocols and controls the memory and radio interface. Data from MAC chip 560 are converted into radio signals by an RF/IF transceiver 562 and sent through a transmit/receive switch 564 and a band-pass filter 566 to an antenna 568. All of the components of WiFi transceiver unit 200 (except for antenna 568) are mounted on WiFi PCBA 118. Antenna 568 may be integrated onto WiFi PCBA 118 as a conductive trace, or it may be a separate discrete antenna attached to WiFi PCBA 118. Since the 802.11 protocols are used, RF/IF transceiver 562 operates at a particular channel in the non-licensed 2.4 GHz band. The frequency is selected using a feedback loop that includes a voltage-controlled oscillator (VCO) 570 and a loop filter 572

Since the optical drive electronics 100 and WiFi transceiver unit 200 are peripherals, it may be necessary to have a controlling CPU/memory 576, shown in FIG. 29B, to facilitate communication between these two devices. Optical drive electronics 100 typically use an ATAPI/IDE interface while WiFi transceiver unit 200 might use a PCI, USB, fast serial or general parallel interface. Display 106 is also controlled by CPU/memory 576. CPU/memory 576 can be mounted on WiFi PCBA 118 and can be linked to optical drive electronics 100 via a flex lead represented as bus 578 in FIGS. 29A and 29B. CPU/memory is linked to WiFi transceiver unit 200 via a bus 577.

The conversion of data from the optical controller present on data bus 578 to data suitable for transmission to the WiFi controller on data bus 577 is performed by software running on the CPU/memory 576. These data may represent a video/audio datastream or a command to be executed by the WiFi unit or the optical controller. Both types of data are suitably converted by CPU 576. The software required to perform these conversions can readily be implemented by persons of skill in the art.

In an alternative embodiment, optical drive electronics 100 and transceiver unit 200 communicate directly with each other, and CPU/memory 576 is not required. As another alternative, the function of CPU/memory 576 is incorporated in the MAC chip 560 or the optical drive electronics 100, since both of these ICs have internal microprocessors. In these alternative embodiments, display 106 is controlled by either the MAC chip 560 or the optical drive electronics 100.

Table 4 lists several combinations of ICs that could be used for MAC chip 560 and RF/IF transceiver 562.

TABLE 4

| Supplier | MAC Chip 560 | RF/IF Transceiver 562 |
| --- | --- | --- |
| Texas Instruments | TNETW1250 | TNETW3422M |
| BroadCom | BCM4301 | BCM2051 |
| Conexant | ISL3871 | ISL3684 |
| Atheros | 5213 | 5112 |

Alternatively, the BroadCom BCM94317 system-on-a-chip could be used for both functions.

As described above, the disc drive of this invention is portable and consequently operates from a battery. It is important to conserve battery power in order to operate the drive over a substantial period of time and maximize the entertainment experience. In practice, the disc drive "spins up" periodically to transfer the data from the disc to a buffer which could reside within either the disc drive itself or the host device. The remainder of the time, between spin-ups, the disc drive is in a quiescent state, in which relatively little battery power is consumed. To conserve battery power, it is advantageous for the disc drive to have a minimal duty cycle, i.e., the proportion of the time that the drive is reading data from the disc and transmitting the data to a host device. The duty cycle is a function of (a) the compression factor used in storing the data on the disc and (b) the rate at which the data is transferred from the disc drive to the host device.

For example, a 133-minute video recorded with VGA resolution (640×480 pixels/frame) and 24 bit color would occupy over 200 GB in its uncompressed form. Using the compression algorithm MPEG-4 and a compression factor of 200 it can be compressed to approximately 1 GB while maintaining at least a DVD-quality output. At a data transfer rate of 10 Mbit/sec (802.11b), the compressed data can be transferred to a host device (e.g., a PDA or smartphone) in approximately 13.3 minutes This equates to a duty cycle of 13.3/133 or about 10%. The data transfer rate could be greater than 10 Mbit/sec to make the duty cycle be less than 10% if, for example, WiFi 802.11g transfer rates of 50 Mbit/sec were used.

A limiting factor for the data compression factor is the quality of the video output in the host device. Using the compression algorithm MPEG-4, the data can be compressed by a factor of 200 while yielding a DVD-quality video output. Audio content is also included in the data stored on the disc, but it is normally a relatively small proportion of the total amount of data stored on the disc.

The disc drive spins up periodically to fill the buffer memory which resides either in the disc drive or the host device. If in the disc drive, the buffer memory could be part of CPU/memory 576 shown in FIG. 29B, for example. Alternatively, the buffer memory could be part of optical controller section 502, shown in FIG. 29A.

Each time, the spin-up begins when the buffer memory is nearly empty. For example, in the example above, if the host device has a 512 MB buffer memory, optical drive assembly 120 needs to operate for only two 6.7-minute periods to transfer the 133 minute video to the host device. If the host device has a 256 MB buffer memory, optical drive assembly 120 would operate for four 3.3-minute periods, and so forth.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

We claim:

1. A disc drive comprising:
    an optical pickup head utilizing a blue laser beam for reading data recorded on an optical data storage disc;
    an analog front end processor;
    a DVD-compatible optical controller for processing a signal output from the analog front end processor; and
    a cartridge load module;
    wherein the cartridge load module is structured to hold an optical data storage disc measuring approximately 32 mm in diameter.

2. The disc drive of claim 1 wherein the cartridge load module is structured to hold a cartridge containing said optical data storage disc.

3. The disc drive of claim 1 wherein the optical pickup head comprises an objective lens having a numerical aperture approximately equal to 0.73.

4. The disc drive of claim 3 wherein the optical pickup head comprises a laser diode adapted to generate a laser beam having a wavelength of approximately 405 nm.

5. The disc drive of claim 1 comprising a spindle assembly, the spindle assembly comprising a spindle pin surrounded by a magnet.

6. The disc drive of claim 1 wherein the analog front end processor and the DVD-compatible optical controller are located on the same integrated circuit chip.

7. The disc drive of claim 1 wherein the analog front end processor and the DVD-compatible optical controller are located on separate integrated circuit chips.

8. A disc drive comprising:
- an optical pickup head utilizing a blue laser beam for reading data recorded on an optical data storage disc;
- an analog front end processor;
- a DVD-compatible optical controller for processing a signal output from the analog front end processor; and
- a cartridge load module;
- wherein the disc drive is adapted to read data from an optical data storage disc measuring approximately 32 mm in diameter.

9. The disc drive of claim 8 wherein the optical pickup head comprises an objective lens having a numerical aperture approximately equal to 0.73.

10. The disc drive of claim 9 wherein the optical pickup head comprises a laser diode adapted to generate a laser beam having a wavelength of approximately 405 nm.

11. The disc drive of claim 8 comprising a spindle assembly, the spindle assembly comprising a spindle pin surrounded by a magnet.

12. A disc drive comprising:
- an optical pickup head utilizing a blue laser beam for reading data recorded on an optical data storage disc;
- an analog front end processor;
- a DVD-compatible optical controller for processing a signal output from the analog front end processor; and
- a cartridge load module;
- wherein the cartridge load module is structured to hold an optical data storage disc measuring 32 mm in diameter.

13. The disc drive of claim 12 wherein the cartridge load module is structured to hold a cartridge containing said optical data storage disc.

14. The disc drive of claim 12 wherein the optical pickup head comprises an objective lens having a numerical aperture equal to 0.73.

15. The disc drive of claim 14 wherein the optical pickup head comprises a laser diode adapted to generate a laser beam having a wavelength of 405 nm.

16. The disc drive of claim 12 comprising a spindle assembly, the spindle assembly comprising a spindle pin surrounded by a magnet.

17. A disc drive comprising:
- an optical pickup head utilizing a blue laser beam for reading data recorded on an optical data storage disc;
- an analog front end processor;
- a DVD-compatible optical controller for processing a signal output from the analog front end processor; and
- a cartridge load module;
- wherein the disc drive is adapted to read data from an optical data storage disc measuring 32 mm in diameter.

18. The disc drive of claim 17 wherein the optical pickup head comprises an objective lens having a numerical aperture equal to 0.73.

19. The disc drive of claim 18 wherein the optical pickup head comprises a laser diode adapted to generate a laser beam having a wavelength of 405 nm.

20. The disc drive of claim 17 comprising a spindle assembly, the spindle assembly comprising a spindle pin surrounded by a magnet.

* * * * *